US011615623B2

(12) United States Patent
Khadloya et al.

(10) Patent No.: US 11,615,623 B2
(45) Date of Patent: Mar. 28, 2023

(54) OBJECT DETECTION IN EDGE DEVICES FOR BARRIER OPERATION AND PARCEL DELIVERY

(71) Applicant: Nortek Security & Control LLC, Carlsbad, CA (US)

(72) Inventors: Krishna Khadloya, San Jose, CA (US); Vaidhi Nathan, San Jose, CA (US)

(73) Assignee: Nortek Security & Control LLC, Carlsbad, CA (US)

( * ) Notice: Subject to any disclaimer, the term of this patent is extended or adjusted under 35 U.S.C. 154(b) by 259 days.

(21) Appl. No.: 16/442,230

(22) Filed: Jun. 14, 2019

(65) Prior Publication Data

US 2019/0303684 A1    Oct. 3, 2019

Related U.S. Application Data

(63) Continuation-in-part of application No. 16/279,512, filed on Feb. 19, 2019.
(Continued)

(51) Int. Cl.
*G06V 20/52* (2022.01)
*H04N 7/18* (2006.01)
(Continued)

(52) U.S. Cl.
CPC .............. *G06V 20/52* (2022.01); *G06T 7/248* (2017.01); *G06V 40/10* (2022.01);
(Continued)

(58) Field of Classification Search
CPC ............ G06K 9/00771; G06K 9/00362; G06T 7/248; G07C 9/00571; H04N 7/188
See application file for complete search history.

(56) References Cited

U.S. PATENT DOCUMENTS

| 6,028,626 A | 2/2000 | Aviv |
| 6,069,655 A | 5/2000 | Seeley et al. |

(Continued)

FOREIGN PATENT DOCUMENTS

| CN | 104346607 A | 11/2014 |
| CN | 105931406 A | 9/2016 |

(Continued)

OTHER PUBLICATIONS

"U.S. Appl. No. 16/279,512, Final Office Action dated Apr. 7, 2021", 18 Pgs.
(Continued)

*Primary Examiner* — Qun Shen
(74) *Attorney, Agent, or Firm* — Schwegman Lundberg & Woessner, P.A.

(57) ABSTRACT

Human or object presence in or absence from a field-of-view of a camera can be achieved by analyzing camera data using a processor inside of or adjacent to the camera itself. In an example, a video signal processing system receives image data from one or more cameras and uses a processing circuit to determine whether a designated object is or is not present at a particular time, during a particular interval, or over a designated sequence of frames. In an example, the designated object can include one or more of a human being, a vehicle, or a parcel. In an example, results of the determination, such as including positive human or object identification, can be used as a trigger for operation of a barrier or access door.

18 Claims, 17 Drawing Sheets

US 11,615,623 B2
Page 2

Related U.S. Application Data

(60) Provisional application No. 62/632,416, filed on Feb. 19, 2018, provisional application No. 62/632,417, filed on Feb. 19, 2018.

(51) Int. Cl.
*G06T 7/246* (2017.01)
*G07C 9/00* (2020.01)
*G06V 40/10* (2022.01)

(52) U.S. Cl.
CPC ......... *G07C 9/00571* (2013.01); *H04N 7/188* (2013.01); *G06T 2207/10016* (2013.01); *G06T 2207/20081* (2013.01); *G06T 2207/20084* (2013.01); *G06T 2207/30196* (2013.01); *G06T 2207/30232* (2013.01)

(56) References Cited

U.S. PATENT DOCUMENTS

| | | |
|---|---|---|
| 6,184,926 B1 | 2/2001 | Khosravi et al. |
| 6,421,462 B1 | 7/2002 | Christian et al. |
| 6,594,629 B1 | 7/2003 | Basu et al. |
| 6,681,032 B2 | 1/2004 | Bortolussi et al. |
| 6,940,545 B1 | 9/2005 | Ray et al. |
| 7,051,003 B1* | 5/2006 | Kobata ............... H04L 63/0428 705/54 |
| 7,113,090 B1 | 9/2006 | Saylor et al. |
| 7,227,567 B1 | 6/2007 | Beck et al. |
| 7,391,907 B1 | 6/2008 | Venetianer et al. |
| 7,796,780 B2 | 9/2010 | Lipton et al. |
| 7,801,330 B2 | 9/2010 | Zhang et al. |
| 7,847,820 B2 | 12/2010 | Vallone et al. |
| 7,999,857 B2 | 8/2011 | Bunn et al. |
| 8,139,098 B2 | 3/2012 | Carter |
| 8,564,661 B2 | 10/2013 | Lipton et al. |
| 8,660,249 B2 | 2/2014 | Rondeau et al. |
| 8,949,889 B1* | 2/2015 | Erdmann ......... H04N 21/25883 725/35 |
| 9,105,053 B2 | 8/2015 | Cao et al. |
| 9,176,608 B1 | 11/2015 | Baldwin et al. |
| 9,208,675 B2 | 12/2015 | Xu et al. |
| 9,224,044 B1 | 12/2015 | Laska et al. |
| 9,230,560 B2 | 1/2016 | Ehsani et al. |
| 9,313,312 B2 | 4/2016 | Merrow et al. |
| 9,373,076 B1 | 6/2016 | Appelman et al. |
| 9,479,354 B2 | 10/2016 | Yamanishi et al. |
| 9,740,940 B2 | 8/2017 | Chattopadhyay et al. |
| 9,756,233 B2 | 9/2017 | Lee et al. |
| 9,805,266 B2 | 10/2017 | Zhang et al. |
| 10,073,428 B2 | 9/2018 | Bruhn et al. |
| 10,102,495 B1* | 10/2018 | Zhang ................ G06Q 10/0838 |
| 10,769,442 B1 | 9/2020 | Ding et al. |
| 10,861,265 B1* | 12/2020 | Merkley ............. G06V 10/751 |
| 11,295,139 B2 | 4/2022 | Khadloya et al. |
| 2003/0137590 A1 | 7/2003 | Barnes et al. |
| 2003/0163289 A1 | 8/2003 | Whelan et al. |
| 2005/0267605 A1 | 12/2005 | Lee et al. |
| 2006/0170769 A1 | 8/2006 | Zhou |
| 2006/0190419 A1 | 8/2006 | Bunn et al. |
| 2007/0002141 A1 | 1/2007 | Lipton et al. |
| 2007/0098220 A1 | 5/2007 | Pilu et al. |
| 2008/0002856 A1 | 1/2008 | Ma et al. |
| 2009/0041297 A1 | 2/2009 | Zhang et al. |
| 2009/0315996 A1 | 12/2009 | Guler et al. |
| 2012/0020524 A1* | 1/2012 | Ishikawa ................ H04N 7/183 382/103 |
| 2012/0026328 A1 | 2/2012 | Sethna et al. |
| 2013/0235195 A1 | 9/2013 | Fujisaki et al. |
| 2013/0250050 A1 | 9/2013 | Kanaujia et al. |
| 2013/0275138 A1 | 10/2013 | Gruber et al. |
| 2014/0222436 A1 | 8/2014 | Binder et al. |
| 2014/0347475 A1 | 11/2014 | Divakaran et al. |
| 2015/0317596 A1* | 11/2015 | Hejazi ................ A47G 29/141 705/330 |
| 2015/0371520 A1 | 12/2015 | Delean |
| 2016/0140391 A1* | 5/2016 | Kim ....................... H04N 5/232 382/103 |
| 2016/0148154 A1* | 5/2016 | Tibbs ................. G06Q 10/0833 705/338 |
| 2016/0180195 A1* | 6/2016 | Martinson ............ G06K 9/6202 382/103 |
| 2016/0180667 A1* | 6/2016 | Bunker ............. G08B 13/19613 382/103 |
| 2016/0217326 A1 | 7/2016 | Hosoi |
| 2017/0011340 A1* | 1/2017 | Gabbai ................ G08G 5/0034 |
| 2017/0053191 A1 | 2/2017 | Koyama |
| 2017/0147153 A1* | 5/2017 | Gu ....................... G06V 30/224 |
| 2017/0213080 A1 | 7/2017 | Nathan et al. |
| 2017/0213081 A1 | 7/2017 | Nathan et al. |
| 2018/0031700 A1 | 2/2018 | Horishita et al. |
| 2018/0129885 A1* | 5/2018 | Potter .............. G08B 13/19628 |
| 2018/0165637 A1* | 6/2018 | Romero ............. G06Q 10/0833 |
| 2018/0285647 A1 | 10/2018 | Chen et al. |
| 2018/0295428 A1* | 10/2018 | Bi ...................... H04N 21/8153 |
| 2018/0342329 A1 | 11/2018 | Rufo et al. |
| 2019/0043290 A1 | 2/2019 | Morris et al. |
| 2019/0258866 A1 | 8/2019 | Khadloya et al. |

FOREIGN PATENT DOCUMENTS

| | | |
|---|---|---|
| CN | 106372576 A | 2/2017 |
| CN | 206712917 U | 12/2017 |
| CN | 107609512 A | 1/2018 |
| CN | 108540762 A | 9/2018 |
| CN | 108734300 A | 11/2018 |
| EP | 0772169 A2 | 5/1997 |
| JP | 2007315965 A | 12/2007 |

OTHER PUBLICATIONS

"U.S. Appl. No. 16/279,512, Non Final Office Action dated Oct. 29, 2020", 14 pgs.

"U.S. Appl. No. 16/279,512, Response filed Jan. 29, 2021 to Non Final Office Action dated Oct. 29, 2020", 24 pgs.

"Google scholar search results", [Online] Retrieved from the Internet: <URL: https://patents.google.com>, (accessed Oct. 24, 2020), 6 pgs.

"U.S. Appl. No. 16/279,512, Non Final Office Action dated Jul. 19, 2021", 19 pgs.

"U.S. Appl. No. 16/279,512, Response filed Jul. 6, 2021 to Final Office Action dated Apr. 7, 2021", 20 pgs.

"U.S. Appl. No. 16/279,512, Response filed Nov. 19, 2021 to Non Final Office Action dated Jul. 19, 2021", 15 pgs.

"U.S. Appl. No. 16/279,512, Notice of Allowance dated Jan. 10, 2022", 8 pgs.

"Eyewatch", Eyewatch Website, URL: https://eye-watch.in/Login.action, (accessed Feb. 4, 2019), 11 pgs.

"Home Automation with Smart Speakers—Amazon Echo vs. Google Home vs. Apple HomePod", Citius Minds Blog, accessed Feb. 4, 2019, URL: https://www.citiusminds.com/blog/wp-content/uploads/2017/08/Home_Automation_Smart_Speakers.pdf, (Aug. 2017), 20 pgs.

Amaryllo International, "ATOM, First Intelligent Security Robot That Recognizes Faces", Kickstarter (Online), accessed Feb. 19, 2019, URL: https://www.kickstarter.com/projects/555543571/atom-the-first-intelligent-security-robot, (2016), 48 pgs.

Banerjee, Prithviraj, et al., "Human Motion Detection and Tracking for Video Surveillance", Proc. of the National Conference of Tracking and Video Surveillance Activity Analysis, (2008), 5 pgs.

Bhavani, K., et al., "Real time Face Detection and Recognition in Video Surveillance", Intl. Research Journal of Engineering and Technology (IRJET), vol. 4, Issue 6, (Jun. 2017), 4 pgs.

Chang, Vincent, "Beseye Pro: Clever design and people recognition", The Straits Times (Online), accessed Feb. 19, 2019, URL: https://www.straitstimes.com/tech/cameras/beseye-pro-clever-design-and-people-recognition, (Feb. 14, 2017), 4 pgs.

El Ansari, Mohamed, et al., "A Hybrid Pedestrian Detection System based on Visible Images and LIDAR Data", Proc. of the 13th Intl.

(56) References Cited

OTHER PUBLICATIONS

Joint Conference on Computer Vision, Imaging and Computer Graphics Theory and Applications (VISIGRAPP), (2018), 10 pgs.
He, Li, et al., "Human Detection using Mobile Embedded Smart Cameras", 5th ACM/IEEE Intl. Conference on Distributed Smart Cameras (ICDSC), (2011), 6 pgs.
Hsu, Jeremy, "Object-Detection Software to Enable Search Within Videos", Popular Science (Online), accessed Feb. 19, 2019, URL: https://www.popsci.com/technology/article/2009-11/computers-could-someday-search-objects-within-videos, (Nov. 4, 2009), 2 pgs.
Huang, Hua, et al., "WiDet: Wi-Fi Based Device-Free Passive Person Detection with Deep Convolutional Neural Networks", Proc. of the 21st ACM Intl. Conference on Modeling, Analysis and Simulation of Wireless and Mobile Systems (MSWIM), (2018), 53-60.
Jacobson, Julie, "Patent: Vivint 'Door Knock' Tech Might Help Identify Guests by Unique Sound Signatures", CE Pro Magazine and Website, accessed Feb. 4, 2019, URL: https://www.cepro.com/article/patent_audio_analytics_ai_vivint_door_knock_identify_people_sound_signature, (Apr. 20, 2017), 7 pgs.
Jurrien, Ilse, "Samsung Bixby Smart Speaker met Camera en Display", LetsGo Digital, accessed Feb. 4, 2019, w/ English machine translation, URL: https://nl.letsgodigital.org/speakers-hifi/samsung-bixby-smart-speaker/, (Jun. 13, 2018), 12 pgs.
Lei, Zhen, et al., "Real-time Face Detection and Recognition for Video Surveillance Applications", World Congress on Computer Science and Information Engineering, (2009), 5 pgs.
Lovell, Brian C., et al., "Real-time Face Detection and Classification for ICCTV", Encyclopedia of Data Warehousing and Mining, (2009), 19 pgs.
Mahdi, Fahad Parvez, et al., "Face recognition-based real-time system for surveillance", Intelligent Decision Technologies 11, (2017), 14 pgs.
Metz, Rachel, et al., "Using Deep Learning to Make Video Surveillance Smarter", MIT Technology Review Online, [Online] Retrieved from the internet on Feb. 4, 2019: <URL: https://www.technologyreview.com/s/540396/using-deep-learning-to-make-video-surveillance-smarter/>, (Aug. 17, 2015), 3 pgs.
Paul, Manoranjan, et al., "Human detection in surveillance videos and its applications—a review", EURASIP Journal on Advances in Signal Processing, (2013), 16 pgs.
Rasti, Pejman, et al., "Convolutional Neural Network Super Resolution for Face Recognition in Surveillance Monitoring", Proc. of the Intl. Conference on Articulated Motion and Deformable Objects (AMDO), (Jul. 2, 2016), 175-184.
Rosebrock, Adrian, "Real-time object detection with deep learning and OpenCV", PyImageSearch (Online), accessed Feb. 19, 2019, URL: https://www.pyimagesearch.com/2017/09/18/real-time-object-detection-with-deep-learning-and-opencv/, (Sep. 18, 2017), 9 pgs.
Shaw, C. Mitchell, "New Patents: Google Wants to Monitor Everything You and Your Children Do at Home", The New American, accessed Feb. 4, 2019, URL: https://www.thenewamerican.com/tech/computers/item/30733-new-patents-google-wants-to-monitor-everything-you-and-your-children-do-at-home, (Nov. 26, 2018), 9 pgs.
Shu, Guang, "Human Detection, Tracking and Segmentation in Surveillance Video", PhD Dissertation at the U. of Central Florida, Orlando, (2014), 147 pgs.
Upasana, Ahire, et al., "Real Time Security System using Human Motion Detection", Intl. Journal of Computer Science and Mobile Computing, vol. 4, Issue 11, (Nov. 2015), 6 pgs.
Vijayakumar, J., et al., "Human Motion Detection in Video Surveillance Using Computer Vision Technique", Intl. Research Journal of Engineering and Technology (IRJET), vol. 4, Issue 8, (Aug. 2017), 5 pgs.
Whitney, Lance, "How to Call Someone From Your Amazon Echo", PC Magazine Online, accessed Feb. 4, 2019, URL: https://www.pcmag.com/feature/358674/how-to-call-someone-from-your-amazon-echo, (Dec. 25, 2018), 13 pgs.
Newcomb, Alyssa, "Amazon Will Now Deliver Inside Your Home—And Record the Whole Thing", NBC News, [Online] Retrieved from the internet on May 1, 2019: URL: https://www.nbcnews.com/tech/tech-news/amazon-will-now-deliver-inside-your-home-record-whole-thing-n814276, (Oct. 25, 2017), 3 pgs.

* cited by examiner

|    | C1   | C2  | C3   | C4   |
|----|------|-----|------|------|
| R1 | V_10 | V_8 | V_6  | V_4  |
| R2 | V_1  | V_7 | V_10 | V_9  |
| R3 | V_9  | V_7 | V_10 | V_5  |
| R4 | V_5  | V_2 | V_7  | V_10 |

FIG. 7

OBJECT DETECTION IN EDGE DEVICES FOR BARRIER OPERATION AND PARCEL DELIVERY

CLAIM OF PRIORITY

This patent application is a continuation-in-part of U.S. patent application Ser. No. 16/279,512, entitled "Human Presence Detection in Edge Devices", filed on Feb. 19, 2019, which application claims the benefit of priority of the following U.S. Provisional Patent Applications:

U.S. Provisional Patent Application Ser. No. 62/632,417, entitled "System and Method for human detection inside cameras", filed on Feb. 19, 2018, and U.S. Provisional Patent Application Ser. No. 62/632,416, entitled "System and Method for creating data dashboards from video streams for operational intelligence", filed on Feb. 19, 2018, the benefit of priority of each of which is claimed hereby, and each of which is incorporated by reference herein in its entirety.

BACKGROUND

Video cameras, including webcams, mobile device-based cameras, closed-circuit or security cameras, or other edge-based devices, sensors, and other devices are prevalent in society. Internet or server-based systems can receive or use data from such cameras. In an example, machine vision technology can be used to process image data from cameras and determine whether specific objects exist in an environment monitored by a camera.

In an example, a camera system can be configured to detect motion using image data. In some cases, camera data is uploaded to a central server or processor that is configured to provide information about motion or configured to identify one or more objects in the environment. With advancing Internet technology, it is feasible to provide web services that can automatically scale upon user demand, often by use of various types of automated service provisioning methods and virtual machine migration methods, such as can be used to process image data received from remote sources.

OVERVIEW

Various sensors can be configured to receive image and video data. For example, various home security and comfort or utility sensors can include, or can be modified to include, a visual sensor to capture image and video data. In an example, the image or video data can be captured when another sensor detects a particular event or condition such as a motion event, fire or smoke, a glass break, a window or door opening, a temperature status, a light switch status, a detected presence of one or more persons or vehicles or other designated objects, or other condition.

In an example, object detection in image or video data can be performed manually by an operator who monitors images and videos, or object detection is performed remotely to an image receiver using a networked server or processor. The present inventors have recognized that a problem to be solved includes performing object recognition in edge devices such as cameras using a minimum number of processing cycles and processing power. The present inventors have recognized that a problem to be solved includes performing object recognition in edge devices such as cameras or visual sensors embedded as part of one or more other sensors. In an example, object recognition allows for machine-based verification of a scene and can include identification of objects or verification of events as identified or captured by other sensors. For example, images and video clips can be used to verify a scene around the sensors and also alert for presence of a particular object, such as a human being, which, in some cases, can increase a criticalness of some events like a building fire. Generally, as discussed herein, a camera is a visual sensor and the camera can be an independent device or can be embedded in other home, office, security, or other auxiliary sensor.

In an example, a solution to the problem includes combining multiple image analysis results at or in a camera with low power, and performing object recognition substantially in real-time. The solution can include an optimized runtime environment to execute neural network-based inferencing models. That is, the solution can include performing inferencing computations in a constrained processing environment, such as inside a low power camera device or other edge processor.

In an example, an edge-based device can include various types of sensors. Such sensors can include a general purpose sensor like a PIR (Passive Infra-Red) or other motion sensor, thermostat, door or window contact sensor, fire or smoke alarm or sensor, access-control card readers, and others. Some of these sensors may not have or include an integrated camera module, however, the present systems and methods can be used to augment such sensors by including a camera module in or appurtenant to such sensors.

In an example, information from a neural network-based analysis of images can be used with a "smart" garage or barrier door system. In an example, a smart barrier door system can be augmented using image-based analytics to facilitate delivery of packages or parcels. In an example, the system can include or use image information to validate or authorize delivery personnel or vehicles, or to validate or authorize delivery of a particular parcel. The system can be configured to notify users about upcoming or occurring delivery events, and users can be invited to view such events live.

In an example, a method for using the present systems can include or use one or more of smart cameras, home or other environment sensors, and security or alarm panels or systems, such as can be configured to monitor a protected area at a delivery destination. In an example, an E-Commerce delivery vehicle can be en route to a delivery destination. In an example, delivery personnel can have a mobile device (e.g., LTE or Web connected) that can notify a destination system about a pending delivery to the destination, such as a home or business. In an example, a smart camera can be configured to detect the delivery vehicle and trigger an event to activate monitoring cameras or image recording. In an example, a delivery partner can communicate information about an upcoming delivery, such as to a user or to a home monitoring system.

In an example, at or during a delivery event, a camera can record and/or live stream video information. In an example, the live stream information can include information from one or multiple cameras, such as a camera configured to monitor an outdoor environment or a camera configured to monitor an indoor or other protected environment. The camera, or a control circuit coupled to the camera, can communicate with a control circuit, security panel, or other device, such as a digital lock or barrier door operator. The control circuit can command a barrier door to open, such as fully or partially, to permit delivery of the parcel. In an example, a user can tune in to the live feed from the one or more cameras to monitor the delivery event substantially in real-time. In an example, the user can interact with delivery personnel during the delivery event, such as via text or using one-way or two-way audio communication, such as using a speaker embedded in the camera. Completion of the delivery event can be automatically detected and the barrier door can be automatically closed, and video recording can be terminated and the resulting video can be archived.

In an example, if an adverse event occurs during delivery, then various protective or corrective actions can be automatically taken. For example, if delivery personnel are detected to enter a protected or prohibited area, then an alarm can be triggered, police can be notified, or other action can be taken. In an example, audio analytics of audio information from the monitored environment can be used to detect any unusual sounds during the delivery event and can trigger alert generation.

In an example, various data can be gathered about a delivery event. The data can include video information, audio information, time stamp information, or other data. The data can be stored or reported to various parties, such as a user or consumer, a delivery company, or a source of the parcel, such as an e-commerce retailer. The data can be provide validation or proof of delivery or of acceptance of a delivered parcel.

Aspect 1 can include subject matter (such as an apparatus, a method, a means for performing acts, or a machine readable medium including instructions that, when performed by the machine, that can cause the machine to perform acts), such as can include or use a method for securely receiving delivery of a parcel. Aspect 1 can include receiving a parcel delivery notification at a control circuit, monitoring an environment using a camera, and using an image processor circuit coupled to the camera, analyzing image information from the camera using machine learning to validate the parcel delivery notification. Aspect 1 can further include, when the parcel delivery notification is validated using the image information from the camera, providing a control signal from the control circuit to control operation of a barrier door and facilitate delivery of the parcel.

Aspect 2 can include or use, or can optionally be combined with the subject matter of Aspect 1, to optionally include analyzing the image information to validate the parcel delivery notification, including determining whether known delivery personnel are detected in the image information from the camera, In an example, providing the control signal to control operation of the barrier door in Aspect 2 includes providing instructions to open the barrier door when the known delivery personnel are detected.

Aspect 3 can include or use, or can optionally be combined with the subject matter of one or any combination of Aspects 1 or 2 to optionally include analyzing the image information to validate the parcel delivery notification by determining whether a known delivery vehicle is detected in the image information from the camera. In an example, providing the control signal to control operation of the barrier door in Aspect 3 includes providing instructions to open the barrier door when the known delivery vehicle is detected.

Aspect 4 can include or use, or can optionally be combined with the subject matter of one or any combination of Aspects 1 through 3 to optionally include analyzing the image information to validate the parcel delivery notification by determining that known delivery personnel and/or a known delivery vehicle is not detected in the image information from the camera. In an example, providing the control signal to control operation of the barrier door in Aspect 4 includes providing instructions to close the barrier door or to maintain the barrier door in a closed position, Aspect 5 can include or use, or can optionally be combined with the subject matter of one or any combination of Aspects 1 through 4 to optionally include, using the image processor circuit, analyzing subsequent image information from the camera to detect when a delivery event corresponding to the parcel delivery. notification is completed, and providing a second control signal from the control circuit to close or secure the barrier door.

Aspect 6 can include or use, or can optionally be combined with the subject matter of one or any combination of Aspects 1 through 5 to optionally include receiving the parcel delivery notification at the control circuit including receiving an indication that a parcel delivery to a premises monitored by the camera is imminent.

Aspect 7 can include or use, or can optionally be combined with the subject matter of Aspect 6, to optionally include receiving the indication that the parcel delivery is imminent from one or more of a delivery driver, a mobile device associated with the delivery driver, a dispatch system, or a delivery vehicle.

Aspect 8 can include or use, or can optionally be combined with the subject matter of one or any combination of Aspects 1 through 7 to optionally include, when the parcel delivery notification is validated using the image information from the camera, then recording video and/or audio information using the same camera or a different camera, the video and/or audio information corresponding in time with delivery of the parcel or corresponding in location with delivery of the parcel.

Aspect 9 can include or use, or can optionally be combined with the subject matter of one or any combination of Aspects 1 through 8 to optionally include, when the parcel delivery notification is validated using the image information from the camera, then notifying a user that a delivery event is underway at a premises monitored by the camera.

Aspect 10 can include or use, or can optionally be combined with the subject matter of one or any combination of Aspects 1 through 9 to optionally include providing a live video and/or audio feed from the camera to a user when the parcel delivery notification is validated using the image information from the camera.

Aspect 11 can include or use, or can optionally be combined with the subject matter of one or any combination of Aspects 1 through 10 to optionally include, when the parcel delivery notification is validated using the image information from the camera, then providing a control signal from the control circuit to open the barrier door by a specified minimum opening amount to facilitate delivery of the parcel and inhibit entry of other unauthorized objects.

Aspect 12 can include or use, or can optionally be combined with the subject matter of one or any combination of Aspects 1 through 11 to optionally include analyzing the image information from the camera using machine learning to validate the parcel delivery notification, including by applying one or more frames from the camera as an input to a first neural network and, in response, receiving an indication of a likelihood that the one or more frames includes at least a portion of a specified object. In an example, in Aspect 12, providing the control signal to control operation of the barrier door includes when the likelihood meets or exceeds a threshold likelihood criteria.

Aspect 13 can include or use, or can optionally be combined with the subject matter of Aspect 12, to optionally include the specified object includes one or more of the parcel, delivery personnel, or a delivery vehicle.

Aspect 14 can include or use, or can optionally be combined with the subject matter of one or any combination of Aspects 1 through 13 to optionally include analyzing the image information from the camera using machine learning to validate the parcel delivery notification, including by receiving multiple frames from the camera, the multiple frames corresponding to a sequence of substantially adjacent time instances, and identifying a difference between a portion of at least first and second frames from among the multiple frames, the difference indicating movement by an object in an environment monitored by the camera, and selecting a third frame from among the multiple frames for full-frame analysis, and applying the third frame as an input to a first neural network and, in response, receiving a first indication of a likelihood that the third frame includes at least a portion of a specified object. In an example, Aspect 14 can include providing a validation score based on the identified difference and on the received first indication of the likelihood that the third frame includes at least a portion of the specified object, and providing the control signal to control operation of the barrier door can be conditioned on the validation score.

Aspect 15 can include or use, or can optionally be combined with the subject matter of Aspect 14, to optionally include the specified object includes one or more of the parcel, delivery personnel, or a delivery vehicle.

Aspect 16 can include or use, or can optionally be combined with the subject matter of Aspect 15, to optionally include selecting the third frame from among the multiple frames, including selecting one of the first and second frames, and one of the first and second frames can include information about a moving object in the environment, Aspect 17 can include or use, or can optionally be combined with the subject matter of Aspect 16, to optionally include receiving the multiple frames from the camera includes receiving frames at a rate of less than about 100 ms or at a rate of greater than about 500 ms.

Aspect 18 can include or use subject matter (such as an apparatus, a system, a device, a method, a means for performing acts, or a device readable medium including instructions that, when performed by the device, can cause the device to perform acts, or an article of manufacture), such as can include or use an image-based machine learning system for using neural network processing to determine whether to operate a barrier door in an environment to automatically accept delivery of a parcel into a secure area. In an example, Aspect 18 can include a first camera configured to receive a series of images of the environment, wherein each of the images corresponds to a different frame acquired at a different time and an image processor circuit configured to: identify a difference between a portion of at least first and second frames acquired by the first camera, the difference indicating movement by an object in the environment monitored by the first camera, select a third frame from among the multiple frames for full-frame analysis, apply the third frame as an input to a first neural network and in response determine a first indication of a likelihood that the third frame includes at least a portion of an image of a specified object, and provide an indication that the specified object is present in or absent from the environment based on the identified difference and on the determined first indication of the likelihood that the third frame includes at least a portion of an image of the specified object.

Aspect 19 can include or use, or can optionally be combined with the subject matter of Aspect 18, to optionally include a control circuit configured to operate the barrier door according to an open/close instruction signal, and the image processor circuit is configured to generate the open/close instruction signal based on the indication that the specified object is present in or absent from the environment.

Aspect 20 can include or use, or can optionally be combined with the subject matter of one or any combination of Aspects 18 or 19 to optionally include the specified object includes one or more of the parcel, delivery personnel, or a delivery vehicle.

Aspect 21 can include or use, or can optionally be combined with the subject matter of one or any combination of Aspects 18 through 20 to optionally include the first camera comprises a portion of a home or business automation system that includes multiple cameras and other sensors.

Aspect 22 can include or use, or can optionally be combined with the subject matter of one or any combination of Aspects 18 through 21 to optionally include a communication circuit coupled to the image processor circuit and the first camera, and the communication circuit is configured to provide video and/or audio information from the camera to a user when the specified object is indicated to be present in the environment.

Aspect 23 can include or use, or can optionally be combined with the subject matter of one or any combination of Aspects 18 through 22 to optionally include the first camera is configured to receive the series of images of the environment in a YUV color space, and the image processor circuit is configured to identify the difference between a portion of at least first and second frames acquired by the first camera using only the Y information from the YUV color space, and the image processor circuit is configured to apply only the Y information about the third frame from the YUV color space as the input to the first neural network.

Aspect 24 can include or use subject matter (such as an apparatus, a system, a device, a method, a means for performing acts, or a device readable medium including instructions that, when performed by the device, can cause the device to perform acts, or an article of manufacture), such as can include or use a method for operating a barrier based on a determination about whether a designated object is present in or absent from an environment monitored by a camera using image information from the camera. Aspect 24 can include receiving, at a first processor circuit, multiple frames from the camera, the multiple frames corresponding to a sequence of substantially adjacent time instances. Aspect 24 can include, using the first processor circuit, identifying a difference between a portion of at least first and second frames from among the multiple frames, the difference indicating movement by an object in the environment monitored by the camera and, using the first processor circuit, selecting a third frame from among the multiple frames for full-frame analysis. Aspect 24 can include, using the first processor circuit, applying the third frame as an input to a first neural network and, in response, receiving a first indication of a likelihood that the third frame includes at least a portion of the designated object, and using the first processor circuit, providing a control signal to a barrier control device, the control signal including information about whether the designated object is present in or absent from the environment. In Aspect 24, the information can be based on the identified difference and on the received first indication of the likelihood that the third frame includes at least a portion of an image of the designated object.

Aspect 25 can include or use, or can optionally be combined with the subject matter of Aspect 24, to optionally include operating a barrier door based on the control signal, including: opening the barrier door when the information indicates the designated object is present in the environment, and at least one of closing the barrier door and maintaining the barrier door in a closed position when the information indicates the designated object is absent from the environment.

Aspect 26 can include or use, or can optionally be combined with the subject matter of one or any combination of Aspects 24 or 25 to optionally include opening the barrier door when the information indicates the designated object is present in the environment, and providing information about delivery of a parcel through the barrier door to a user or to a sender of the parcel.

Aspect 27 can include or use, or can optionally be combined with the subject matter of Aspect 26, to optionally include recording audio and/or video information from the environment using the same or different camera, the recording being concurrent with or following the opening the barrier door. In Aspect 27, providing the information about delivery of the parcel through the barrier door can include providing at least a portion of the recorded audio and/or video information.

Aspect 28 can include or use, or can optionally be combined with the subject matter of one or any combination of Aspects 24 through 27 to optionally include, using the first processor circuit, providing a notification to a user to monitor a live feed of video and/or audio information from the environment using the same camera or a different camera, and the video and/or audio information can include information about delivery of a parcel to a secure area behind the barrier.

Aspect 29 can include or use, or can optionally be combined with the subject matter of one or any combination of Aspects 24 through 28 to optionally include receiving a parcel delivery notification at the first processor circuit, and using the first processor circuit, determining a correspondence between the parcel delivery notification and the designated object. In Aspect 29, providing the control signal to the barrier control device can include providing a command to open or close a barrier door based on the correspondence between the parcel delivery notification and the designated object.

Aspect 30 can include or use, or can optionally be combined with the subject matter of Aspect 29, to optionally include receiving the parcel delivery notification from a mobile device of a delivery driver.

Aspect 31 can include or use, or can optionally be combined with the subject matter of one or any combination of Aspects 29 or 30 to optionally include receiving the parcel delivery notification from a vehicle.

Aspect 32 can include or use, or can optionally be combined with the subject matter of one or any combination of Aspects 29 through 31 to optionally include providing the control signal to the barrier control device including providing a command to open the barrier door when the correspondence indicates the designated object is or is likely to be possessed by a source of the parcel delivery notification.

Aspect 33 can include or use, or can optionally be combined with the subject matter of one or any combination of Aspects 24 through 32 to optionally include receiving a parcel delivery notification at the barrier control device and, using the barrier control device, determining a correspondence between the parcel delivery notification and the information about whether the designated object is present in or absent from the environment. In Aspect 33, providing the control signal to the barrier control device can include providing a command to open or close a barrier door based on the correspondence between the parcel delivery notification and the information about whether the designated object is present in or absent from the environment.

Aspect 34 can include or use, or can optionally be combined with the subject matter of one or any combination of Aspects 24 through 33 to optionally include providing the control signal including providing a signal to close a barrier door or to maintain the barrier door in a closed position when the information indicates the designated object is absent from the environment.

Aspect 35 can include or use, or can optionally be combined with the subject matter of one or any combination of Aspects 24 through 34 to optionally include, as the designated object, one or more of a known delivery person, a known delivery device, and a known delivery vehicle.

Each of these non-limiting Aspects or examples can stand on its own, or can be combined in various permutations or combinations with one or more of the other examples.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

FIG. 7 illustrates generally an example of a two dimensional array with information about a cost function.

DETAILED DESCRIPTION

Figure 1:
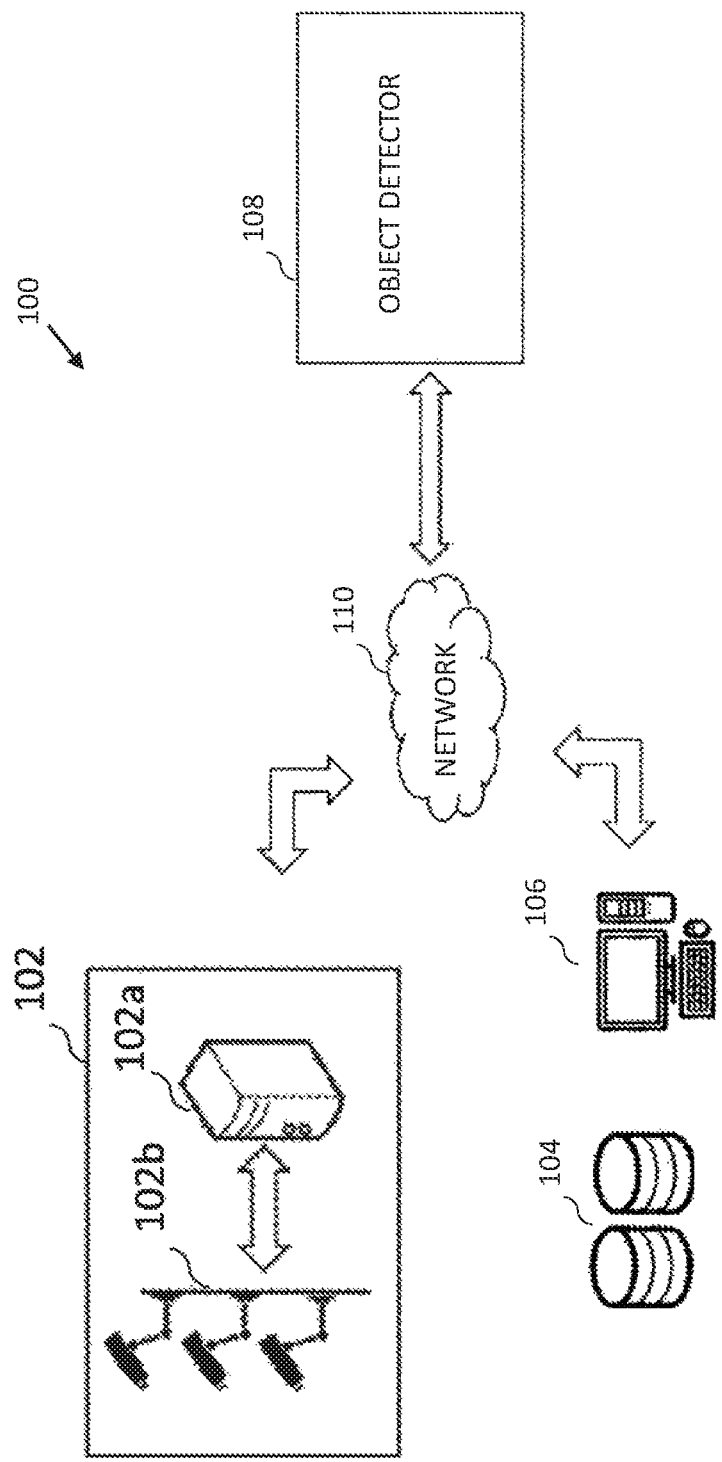
FIG. 1 illustrates generally an example of a system that can be used to receive and process image information.

This detailed description includes references to the accompanying drawings, which form a part of the detailed description. The drawings show, by way of illustration, specific examples in which the invention can be practiced. These examples are also referred to herein as "examples." Such examples can include elements in addition to those shown or described. However, the present inventors also contemplate examples in which only those elements shown or described are provided. The present inventors contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein."

Various algorithms can be employed by computers (devices, machines, systems, etc.) to automatically and accurately detect objects, such as human bodies, vehicles, or other objects, in images and/or videos. In an example, deformable part-based models of Histogram of Oriented Gradients (HOG) features, such as combined with latent Support Vector Machines (SVM) techniques, can be used to detect one or more objects, individuals or human bodies in an image. In an example, part-based detection methods can be used to localize various portions of objects, such as body parts of an individual, in an image. In an example, part-based detection uses root filters and part filters (discussed further below).

In an example, object detection using machines to analyze images includes model training and detection. Training can be an offline step where machine learning algorithms (such as a convolutional neural network, or CNN) are trained on a training data set to learn object forms, such as human forms or non-human forms, from various images. Detection methods can use one or more machine learning models to classify objects or regions in an image or frame. In an example, the detection is performed using a pre-processing step of identifying potential regions for presence of a particular object, such as a human, and a post-processing step of validating the identified potential regions. In the detection step, part-based detectors can be used in the identified region(s) by a root filter such as to localize, or provide information about a location of, each object part or human part.

In an example, filters and deformable part-based models or algorithms can be used together to model a human appearance more accurately and in a more robust manner. Various examples of the filters can include HoG or HoG-like filters. Models can be trained by a latent SVM formulation where latent variables usually specify an object of interest (e.g., a human), such as including relative geometric positions of parts of a human.

In an example, a root filter can be trained for an entire human body and part filters can be separately trained within regions of different root filters using latent SVM techniques. In an example, a model includes root filters which cover the target object and part models that cover smaller parts of the target object. The part models in turn include their respective filters, relative locations and a deformation cost function. To detect a human in an image, an overall score can be computed for each root location, and higher relative score locations can be considered as candidate locations for the human or individual.

FIG. 1 illustrates generally an example of a system 100 that can be used to receive and process image information. The system 100 can include a real-time streaming system 102, a video/image archive 104, a computer system 106 and an object detector 108. The real-time streaming system 102 can include a video server 102a and multiple cameras 102b such as can be installed in the same location or different locations. Examples of such locations include, but are not limited to, homes, roads, parking spaces, garages, toll booths, outside residential areas, outside office spaces, outside public places (such as malls, recreational areas, museums, libraries, hospitals, police stations, fire stations, schools, colleges), and the like. The cameras 102b can include Closed-Circuit Television (CCTVs) cameras, High Definition (HD) cameras, non-HD cameras, handheld cameras, or any other video/image receiving unit.

In an example, the video server 102a of the real-time streaming system 102 is configured to receive dynamic imagery or video footage from the cameras 102b, and transmit the associated data to the object detector 108. In an example, the video server 102a can maintain the dynamic imagery or video footage as received from the cameras 102b. In an example, the cameras 102b can have respective fixed fields of view or can be movable. In an example, at least one of the cameras 102b includes a camera with a 180 degree view sensor and the camera is mounted on a ceiling or wall. Images acquired by such a camera can be de-warped such as prior to further processing. Other 180 degree view or more limited field of view sensors can similarly be used.

In an example, the video/image archive 104 includes a data store that is configured to store recorded or archived videos or images or frames. The video/image archive 104 can include one or more local databases or remote databases such as can be centralized and/or distributed. In an example, the video/image archive 104 can store data using a cloud based scheme.

In an example, the computer system 106 is any computing device remotely located from the object detector 108, and the computer system 106 is configured to store a plurality of videos/images in its local memory. In an example, the computer system 106 can be replaced by one or more of a computing server, a mobile device, a memory unit, a handheld device or any other similar device.

In an example, the functions of the computer system 106 and/or the object detector 108 can be implemented at or in firmware or software residing at or adjacent to any one or more of the cameras 102b. That is, circuitry or processors on-board one or more of the cameras 102b can be used to carry out the same or similar functions of the computer system 106 and/or of the object detector 108.

In an example, the real-time streaming system 102 and/or the computer system 106 can send data (input frames) to the video/image archive 104 for storage and subsequent retrieval. The real-time streaming system 102, the video/image archive 104, and the computer system 106 can be communicatively coupled to the object detector 108 via a network 110.

In an example, the object detector 108 can be part of at least one of a surveillance system, a security system, a traffic monitoring system, a home security system, a toll fee system or the like. In an example, the object detector 108 can be a separate entity configured to detect human bodies. In an example, the object detector 108 can be a separate entity configured to detect vehicles. In an example, the object detector 108 can be a separate entity configured to detect parcels or packages. The object detector 108 can be configured to receive data from any of the systems including the cameras 102b, the real-time streaming system 102, the video/image archive 104, the computer system 106, or a combination of these. The data can be in form of one or more video streams and/or one or more images or frames. If the data is in the in the form of video streams, then the object detector 108 can convert each stream into a plurality of static images or frames before processing. If the data is in the form of image sequences, then the object detector can 108 process the image sequences and generate an output that can include information about, among other things, whether a designated object such as a vehicle, parcel, person, or other object was detected in the environment or on t premises, or can include information about activities occurring in the environment, or can include other information, such as about an object that is determined to be present in or absent from the environment.

In an example, the systems and methods discussed herein can be extended to include or use other sensors at the edge. Such sensors can include, for example, (i) a PIR motion sensor, (ii) a thermostat, (iii) a fire or smoke alarm sensor, (iv) an access control device or card reader, (v) a door or entryway sensor, (vi) a garage or gate sensor, or others. In an example, such edge devices may not include an integrated or embedded camera or image sensor. However, the present systems can be used to augment such edge devices. For example, a camera and an image processor can be added or communicatively coupled to an edge device. The camera can capture images or videos at or near the edge device. In an example, camera activity or image sensing or recording can be triggered or initiated in response to information detected in an image or by an alert or other indication from another sensor.

In an example, a PIR motion sensor can sense motion or activity. Upon positive identification of the motion or activity, the PIR sensor can send a signal to a camera to begin receiving or recording images or video. The images or video can be processed, such as inside the sensor itself, to determine whether a designated object is present in or absent from the scene.

In an example, a processor circuit can be provided outside of a sensor. In this case, image or video information from the camera can be transmitted to the processor circuit for analysis, such as to determine whether a designated object is present in a scene. In an example, such a processor circuit can be a home security panel or controller such as can be located remotely from the sensor such as in a different home or building.

In an example, a device-based object detector or identifier can be configured to provide various information. For example, a result of a human presence detection algorithm can be that (i) a single human is detected to be present in a scene; (ii) multiple human beings are detected to be present in a scene, or (iii) specific or known human being(s) are determined to be present in a scene, and information about the known human beings such as names, credentials, or other characteristics can be determined.

In an example, the object detector 108 is configured to process one or more received images (or frames of video data) and execute various techniques for detecting a presence of a designated object. In an example, the object detector 108 first processes each of multiple received images to identify one or more regions that are likely to include, for example, a human figure, or are likely to include candidate humans. Next, the object detector 108 can identify a root of a body in the one or more regions such as using root filters. Next, the object detector 108 can be used to identify one or more body parts of a detected body based on, e.g., pair-wise constraints. The body parts can be detected using one or more body part detectors as discussed elsewhere herein. The object detector 108 can calculate scores for the various detected body parts and calculate an overall score based on one or more scores associated with the body parts. The overall score can correspond to a confidence that a human or individual is identified in the scene, as opposed to another non-human object. While performing human detection, the object detector 108 can be configured to consider occlusion, illumination or other conditions.

In an example, the network 110 can be any wired network, wireless network, a combination of wired or wireless networks. In an example, the network 110 includes a LAN or wireless LAN, the Internet, a point-to-point connection, or other network connection and combinations thereof. The network 110 can be any other type of network that transmits or receives data, such as from personal devices, telephones, video/image capturing devices, video/image servers, or any other electronic devices. In an example, the network 110 is configured to transmit or send data between the mentioned devices or others. The network 110 can be a local, regional, or global communication network, for example, an enterprise telecommunication network, the Internet, a global mobile communication network, or any combination of similar networks. The network 110 can be a combination of an enterprise network (or the Internet) and a cellular network, in which case, suitable systems and methods are employed to seamlessly communicate between the two networks. In such cases, a mobile switching gateway can be used to communicate with a computer network gateway to pass data between the two networks. The network 110 can include any software, hardware, or computer applications that can provide a medium to exchange signals or data in any of the formats known in the art, related art, or developed later.

Figure 2:
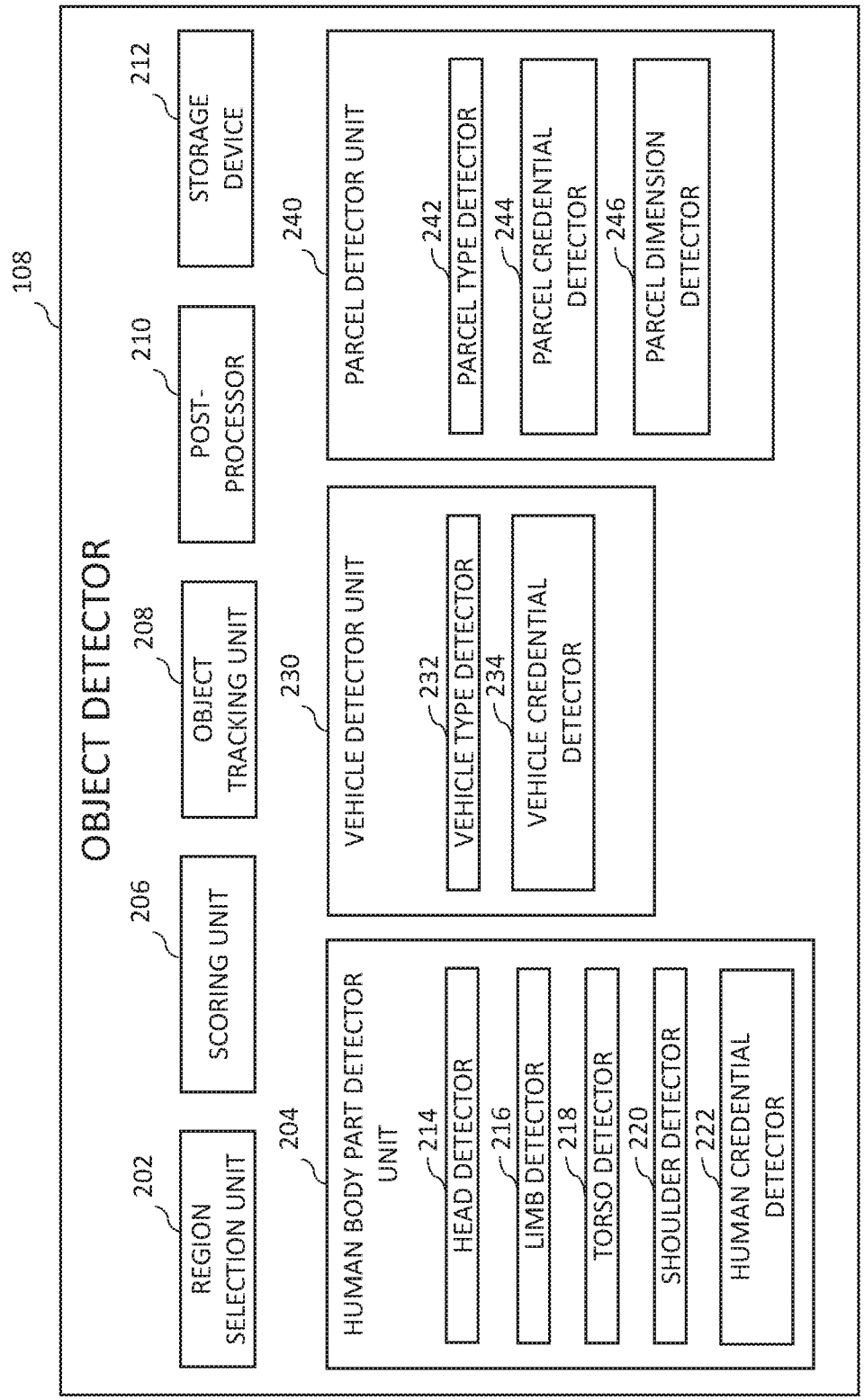
FIG. 2 illustrates generally an example of an object detector and various submodules thereof.

FIG. 2 illustrates generally an example of the object detector 108 and various submodules thereof. In the example of FIG. 2, the object detector 108 includes a region selection unit 202, a human body part detector unit 204, a scoring unit 206, an object tracking unit 208, a post-processor 210, a storage device 212, a vehicle detector unit 230, and a parcel detector unit 240. Various other detector units can similarly be included, such as depending on implementation objectives or objects to be detected or identified.

In the example of FIG. 2, the human body part detector unit 204 can further include a head detector 214, a limb detector 216, a torso detector 218, a shoulder detector 220, a human credential detector 222, or one or more other modules configured to detect various features or aspects of a human figure. The vehicle detector unit 230 can further include a vehicle type detector 232, a vehicle credential detector 234, or one or more other modules configured to detect various features or aspects of a vehicle or other transport mechanism for a parcel. The parcel detector unit 240 can further include a parcel type detector 242, a parcel credential detector 244, a parcel dimension detector 246, or one or more other modules configured to detect various features of aspects of a parcel.

Figure 3:
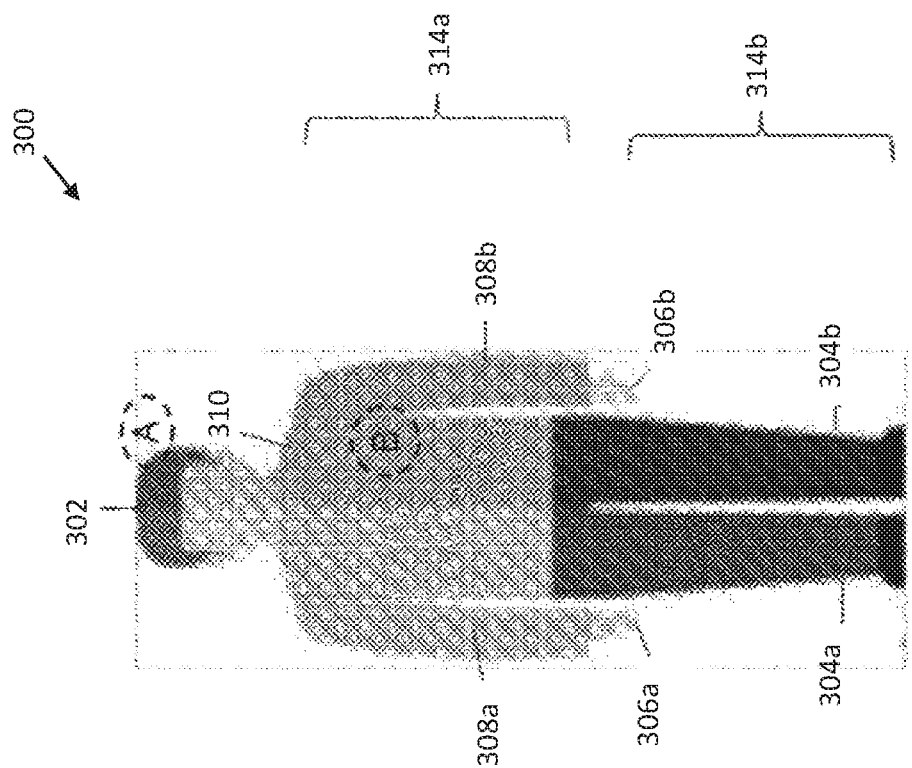
FIG. 3 illustrates generally an example of a human body or individual with various body parts, such as can be observed by one or more cameras.

FIG. 3 illustrates generally an example of a human body or individual 300 with various body parts, such as can be observed by one or more of the cameras 102b. The individual 300 has a head 302, legs 304a and 304b, hands 306a and 306b, arms 308a and 308b, shoulders 310, and limbs 314a and 314b. In an example, the object detector 108 is configured to identify or recognize one or more of the body parts of the individual 300.

Referring again to FIG. 2, in an example, the object detector 108 includes an input unit to receive an image input, such as frame-based image data. In an example, the input unit receives image information from one or more systems including the real-time streaming system 102, the video/image archive 104 and the computer system 106. The input unit can receive a video stream instead of an image and the video stream can be divided into a sequence of frames. In an example, the object detector 108 is configured to remove noise from a received frame before further processing. The frames can be received by the object detector 108 automatically at pre-defined intervals or irregularly. For example, the object detector 108 can receive frames every 1 hour or twice a day. In an example, frames can be received in response to a user or system request.

In an example, images are captured in real-time by the cameras 102b, and the images can be stored in the video/image archive 104 or the computer system 106. The images as received can be in any suitable format for data analysis. The image can include objects such as parcels, human bodies, cars, trees, animals, buildings, any articles and so forth. Further, the images can include one or more regions that include non-human objects. Generally, regions that include or that may include a designated object, such as a parcel, a vehicle, or a human body, is referred to herein as a candidate region. A frame or image can have zero, one, or multiple candidate regions. In an example, a candidate region comprises all or a portion of a. frame. That is, the candidate region can correspond to an entire field of view or less than an entire field of view.

In an example, the region selection unit 202 unit is configured to select one or more candidate regions from the one or more of regions in a frame based on a pre-defined threshold. The pre-defined threshold can indicate a probability of finding a designated object, or portion of a designated object, in a region of the frame. In an example, candidate regions can include bounding boxes that are generated using machine learning-based detector algorithms. These algorithms run efficiently, quickly, and generate candidate regions with false positives that can generally be eliminated through further or more intensive processing.

In an example, the region selection unit 202 executes a region selection algorithm to select one or more candidate regions. The region selection algorithm can be biased to provide a low number of false negatives, meaning if a region includes a human (or other designated object), there is very low probability that the region will be rejected. In an example, the region selection algorithm can be biased to provide a high number of false positives, meaning if a region does not have a human (or other designated object), then the region can be selected. Various algorithms can be used for candidate region selection such as motion-based algorithms, simple HOG and SVM-based algorithms, and foreground pixels detection-based algorithms. After the one or more candidate regions are selected, then the selected regions can be provided to one or more of the detector units (e.g., the human body part detector unit 204, the vehicle detector unit 230, or the parcel detector unit 240) for further processing.

In an example, the human body part detector unit 204 is configured to detect a human body in a candidate region of the one or more candidate regions based on a set of pair-wise constraints. The human body part detector unit 204 can perform parts-based detection of the human body such as to identify a head, limbs, arms, legs, shoulder, torso, and/or hands. In an example, the human body part detector unit 204 includes a set of body part detectors for detecting respective parts of the body. For example, the human body part detector unit 204 includes a head detector 214, a limb detector 216, a torso detector, a leg detector, an arm detector, a hand detector, or a shoulder detector 220. As evident from the names, the head detector 214 is configured to detect a head of a human body, the limb detector 216 is configured to detect upper or lower limbs of a human body, and so on. In an example, the human body part detector unit 204 can include a human credential detector 222. The human credential detector 222 can be configured to detect any visually-identifiable or visually-distinguishing features or indicia that can be used to determine credentials. In an example, the human credential detector 222 is configured to detect a specified uniform, uniform configuration, identification badge, fingerprint or iris pattern, or other distinguishing indication that can be used to validate a human identity or validate a human belongingness to a designated group, such as a delivery company or ecommerce group.

In an example, the vehicle detector unit 230 is configured to detect a vehicle in a candidate region. In an example, the vehicle detector unit 230, similarly to the human body part detector unit 204, can perform parts-based detection of an object such as to identify surfaces of various materials (e.g., glass, metal, plastic, etc.), wheels, propellers, lights, or other features of a vehicle. In an example, the vehicle detector unit 230 includes a set of part detectors for classifying respective parts of a vehicle object. For example, the vehicle detector unit 230 can include the vehicle type detector 232 or the vehicle credential detector 234. In an example, the vehicle type detector 232 is configured to detect or determine a type of vehicle detected, such as to discriminate between one or more of a car, light-duty or heavy-duty truck, drone, cart, robot, autonomous delivery robot, or other vehicle such as can be autonomous, semi-autonomous, remotely controlled, or otherwise operated. In an example, the vehicle credential detector 234 is configured to determine whether a detected vehicle has a specified credential characteristic, such as distinguishing markings that identify the vehicle as belonging to a particular fleet or company. In an example, the vehicle credential detector 234 can be configured to monitor visual information for a specified code (e.g., a bar code, a 2D bar code, etc.) that can be detected on the vehicle.

In an example, the parcel detector unit 240 is configured to detect a parcel in a candidate region. In an example, the parcel detector unit 240, similarly to the human body part detector unit 204, can perform parts-based detection of an object such as to identify surfaces of various materials (e.g., paper, cardboard, plastic, metal, etc.), or dimensions of a parcel. In an example, the parcel can be wrapped or provided in a container (e.g., a box, tube, carton, etc.) or the parcel can be loose. For example, a large or difficult-to-wrap object can be loose or unpackaged, and the parcel detector unit 240 can be configured to identify such an object based on the object's characteristics.

In an example, the parcel detector unit 240 includes a set of part detectors for classifying various parts or attributes of a parcel. For example, the parcel detector unit 240 can include the parcel type detector 242, the parcel credential detector 244, or the parcel dimension detector 246. In an example, the parcel type detector 242 is configured to detect or determine a type of parcel detected, such as to discriminate between one or more of a wrapped package, a loose object, or other parcel object. In an example, the parcel credential detector 244 is configured to determine whether a detected parcel has a specified credential characteristic, such as distinguishing markings that identify the parcel as originating from a particular source. In an example, the parcel credential detector 244 can be configured to monitor visual information for a specified code (e.g., a bar code, a 2D bar code, etc.) that can be detected on the object. In an example, the parcel dimension detector 246 can be configured to determine physical characteristics such as dimensions, sizes, shapes, etc. of a parcel. The determined physical characteristics of the parcel can be compared against a priori information about an expected parcel for validation that delivery of the particular parcel is expected.

In an example, the object detector 108, the human body part detector unit 204, the vehicle detector unit 230, and/or the parcel detector unit 240 can include or use deep Convolution Neural Networks (CNN) to process image or frame data and provide an indication or classification of the information in the image or frame as comprising a designated object, or as comprising a part of a designated object. In an example, a neural network used herein for object detection or analysis can use ResNet or DenseNet architectures, or others. The network can be configured to incorporate or use motion information, such as by analyzing information from multiple image frames over time, to provide a result with information about a presence or absence of an object in a frame. In an example, the network can be configured to use angle or depth information about a candidate object in its determination or classification algorithms.

The neural networks discussed herein and the models employed in such networks can be trained using various data sources. For example, specific training data that corresponds to an end application or end user can be used to train the model employed by the network. The models can be specific to different use cases or environments or can be more general. In an example, a semi-supervised (semi-manual) process can be used to import learning data. In an example, training data can be provided by or to a parcel delivery partner or carrier, such as UPS, FedEx, DHL, Amazon, a national postal service, or other entity.

The neural networks discussed herein can be tuned to maximize power efficiency, such as using fixed-point calculations using weighted or output-quantized nodes. Generally, a network library footprint can be about 1 MB or less of data, however larger library files can be used when more resources (power, processing time) are available. Memory buffers used to perform the neural network-based analysis can be used and reused, that is, the buffers can be swapped throughout execution and are allocated only on demand. In an example, auxiliary hardware and accelerators can be used, such as to perform specific tasks like CV functions, matrix multiplication, CNN execution, and more.

In an example, the human body part detector unit 204 detects a first body part at a first location in a candidate region using a first body part detector of the set of body part detectors. The first body part can be considered a root of a body, for example, a head of the body. The human body part detector unit 204 further detects a second body part at a second location in the candidate region using a second body part detector of the set of body part detectors. The second body part detector is selected from the set of body part detectors, and can be based on a pair-wise constraint. The pair-wise constraint can be determined based on a relative location of the second location with respect to the first location. Pair-wise or other constraints can similarly be used or applied by the vehicle detector unit 230 or the parcel detector unit 240 to facilitate vehicle identification or parcel detection.

In an example, it can be considered that a head is a root of a detected body, and thus, the head is the first body part that gets detected using the head detector 214. Assume the head is located at a first location A. The human body part detector unit 204 selects a second body part which is relatively located at a second location B some distance apart from the first location A (see A and B depicted in the example of FIG. 3). In an example, the second body part includes a limb or shoulder.

In an example, the human body part detector unit 204 is not required to implement or use each of multiple available detectors, however, a decision of whether to apply one or more of the various available detectors can be condition-based. For example, the head detector 214 can be run first and if the head is detected, then other body part detectors 216-220 can be run in appropriate regions, or portions of a frame, relative to the detected head region. The condition-based implementation helps reduce a number of times the detectors are applied and can reduce processing time and power consumption. Further, a conditionally-applied body parts-based network of classifiers helps reduce a size of the network and provides better performance as compared to a full body/person-based classification network. Following identification of the first and second parts such as at the locations A and B, information about the detected first body part and the second body part can be provided to the scoring unit 206 for further processing.

In an example, a constraint-based analysis can be implemented using the vehicle detector unit 230. For example, the vehicle type detector 232 can be used first to identify whether a known or expected vehicle is or is likely to be in a scene. If a known vehicle is identified, then the vehicle detector unit 230 can initiate the vehicle credential detector 234 to validate the vehicle. In an example, a constraint based analysis can similarly be implemented using the parcel detector unit 240. For example, the parcel type detector 242 can be used first to identify whether a known or expected parcel is or is likely to be in a scene. If a known parcel is identified, then the parcel detector unit 240 can initiate the parcel credential detector 244 and/or the parcel dimension detector 246. The detectors can be applied in various different orders or sequences.

In an example, the scoring unit 206 can be configured to compute a score for a candidate region based on at least one of a first score and a second score. The first score corresponds to a score of a first part (e.g., a first body part), while the second score corresponds to a score of a second part (e.g., a second body part). The first score can be determined based on the detection of the first part at the first location and the second score can be determined based on the detection of the second part at the second location. Based on the first score and the second score, an overall score is computed for the detected object by the scoring unit 206. In an example, the overall score can be a summation of the first score and the second score. In another example, the overall score can be a weighted summation of the first score and the second score. In an example, the human body part detector unit 204 can further implement one or more other body part detectors, such as the torso detector 218 or the shoulder detector 220, until a complete or entire human body is detected, In an example, the vehicle detector unit 230 can further implement one or more other detectors until a vehicle is identified, or the parcel detector unit 240 can further implement one or more other detectors until a parcel is identified. Based on the detected objects or object parts, an overall score can be computed.

In an example, the object tracking unit 208 can be configured to track a body, or candidate region, across multiple frames. The tracking can be performed using techniques such as a Mean Shift technique, an Optical Flow technique, a bounding box estimation technique, or other technique. In an example, a detected body can be tracked using the information contained in the current frame and one or more other adjacent (e.g., preceding or subsequent) frames. An object association or correspondence can be determined or provided for the detected objects in the different frames. In an example, a bounding box estimation process is executed, and the bounding box (or other shape containing the object) of an object in a current frame is compared with a bounding box in a previous frame(s) and a correspondence between the objects and/or bounding boxes to establish a cost function. The bounding box techniques can represent region and location information for an entire body or object or less than an entire body or object.

In an example, feature or model-based tracking can be used. According to this example, a pair of objects that includes a minimum value in a cost function can be selected by the object tracking unit 208. A bounding box of each tracked object can be predicted based on maximizing a metric in a local region. The prediction can be made using techniques such as, but not limited to, optical flow, mean shift, and/or dense-sampling search, and can be based on features such as HOG color, Haar features, and the like.

In an example, when object tracking processing is complete, the object tracking unit 208 communicates with the post-processor 210 for further steps. The post-processor 210 can be configured to validate a detected object as one or more of a human body, a vehicle, a parcel, or other object that is in the candidate region. The object can be validated based on at least one of a depth, a height and an aspect ratio of the object. In another example, the validation can be performed based on generic features such as color, HoG, SIFT, Haar, LBP, and the like. In an example, the validation can be performed using a region in a particular frame, using respective regions in multiple frames, or using full-frame analysis.

In an example, the storage device 212. can include a training database including pre-loaded target object images for comparison to a received image (e.g., image information received using one or more of the cameras 102*b*) during a detection process. The training database can include images of, for example, humans in different positions and can include images of humans having different sizes, shapes, genders, ages, hairstyles, clothing, and so on. In an example, the images can be positive image clips for positive identification of objects as human bodies and can include negative image clips for positive identification of objects as non-human bodies. In an example, the training database can include images of vehicles or images of parcels, such as can have different sizes, shapes, types, or other characteristics. In an example, the training database can be maintained by a parcel delivery partner or carrier, such as UPS, FedEx, DHL, Amazon, a national postal service, or other entity.

In an example, the object detector 108 and/or components thereof can be provided in the form of hardware components or software entities or modules that can be implemented using a generic or purpose-built processor. In an example, the object detector 108 can be included in hardware or firmware of a camera used to receive the image data, or can be included in a local or remote processing system. In an example, the object detector 108 can be a part of at least one of a mobile phone, a computer, a server, or a combination thereof.

Various algorithms, components, and processes for implementing human detection are discussed in U.S. Patent Application Publication No. 2017/0213081 ("the '081 publication"), titled "Methods and systems for automatically and accurately detecting human bodies in videos and/or images", which is hereby incorporated herein by reference in its entirety. Any one or more of the different algorithms, components, and processes in the '081 publication can similarly be applied in the context of the present application for the same or similar purpose of human identification in an image. For example, the '081 publication discusses using a Directional Weighted Gradient Histogram (DWGH) for detecting a human body in an image (see the '081 publication at FIG. 4). The DWGH scheme can be used to provide better discrimination between positive and negative images. The '081 publication discusses using Latent Support Vector Machines (SVM) variables to improve detection accuracy. The '081 publication discusses enhancing processing speed and reducing false positives by using regions of detected motion and object tracking across frames. In FIG. 5, the '081 publication illustrates an exemplary method flowchart for detecting a body in an image based on a machine learning model including using deformable parts-based models for detecting human bodies, such as where one or more features are extracted for each part and are assembled to form descriptors based on pair-wise constraints.

Referring again to FIG. 2, the object detector 108 can be implemented in whole or in part at or in hardware or software at or adjacent to a camera, such as in one or more of the cameras 102*b*. In an example, such implementation at a camera can be referred to as edge processing or edge-based processing. In an example, edge processing at a camera can be performed using machine learning models that are trained to work with image in a YUN color space. In an example, edge processing can be performed using machine learning models that are trained to work exclusively on one element of a color space, such as using Y information only from a YUV color space. That is, in an example, color or chrominance information can be disregarded and brightness or luminance information can be used for image recognition processing. In an example, with less than all of YUV information being used by a processor, higher resolution analysis can be performed in a shorter amount of time or using fewer cycles than if all of the YUV information is used together.

Figure 4:
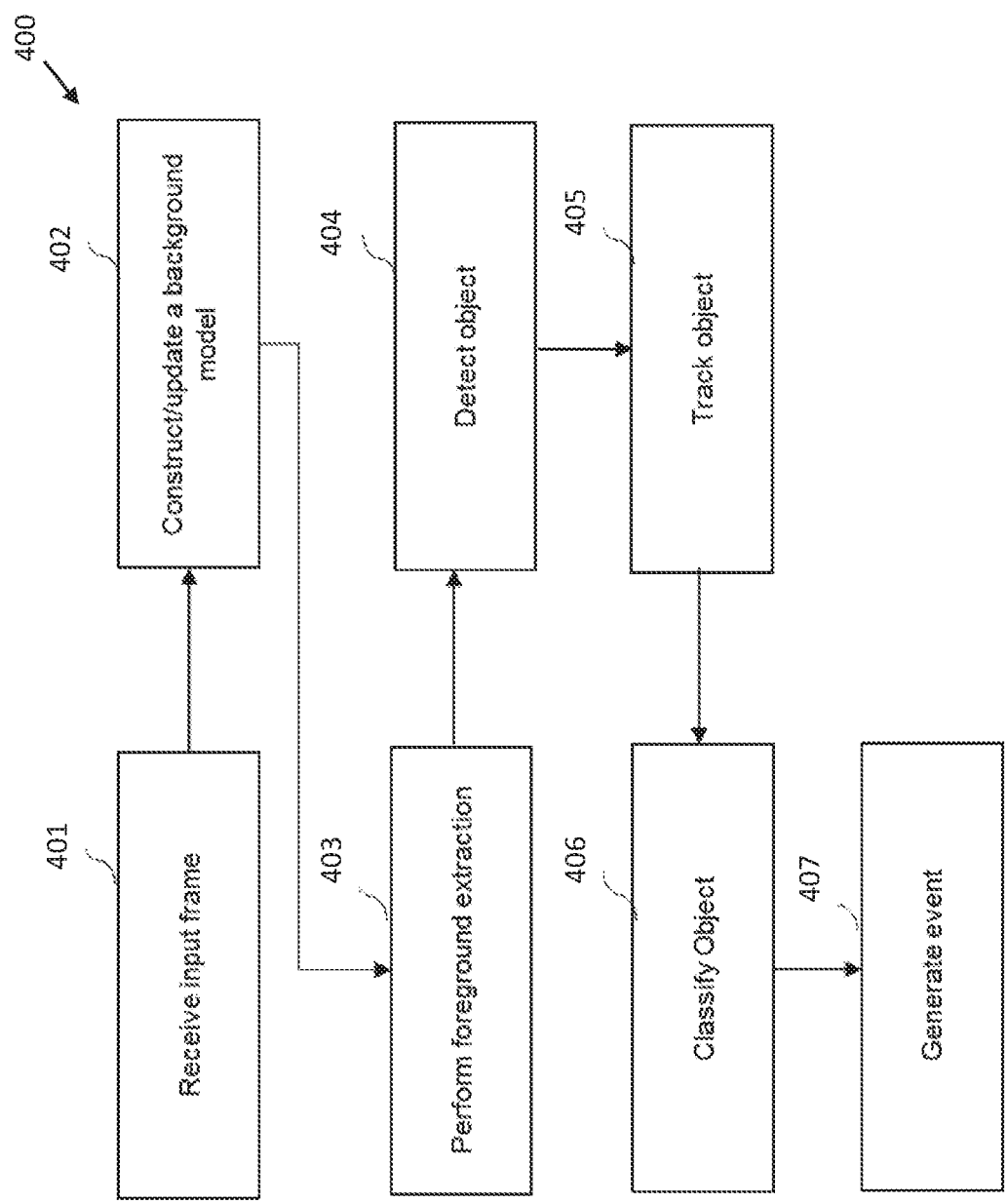
FIG. 4 illustrates generally an example of a method that includes detecting and tracking an object using information from a camera.
Figure 5:
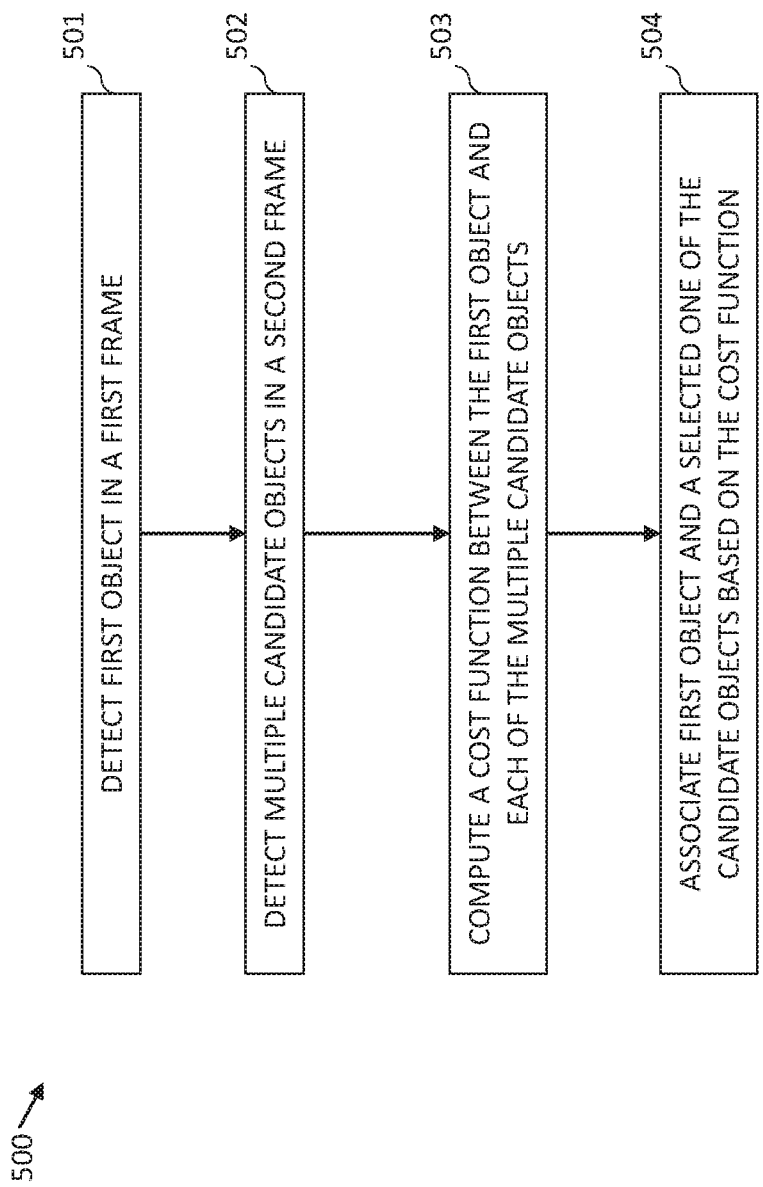
FIG. 5 illustrates generally an example of a method that includes using a cost function to make associations between different candidate objects identified in an image or in a series of images.

FIG. 4 illustrates generally an example of a method 400 that includes detecting and tracking an object using information from a camera. At step 401, the method 400 includes receiving an input frame such as comprising still image information from a camera. In an example, step 401 includes receiving a series of discrete frames over time, such as can be received periodically at regular intervals or at irregular intervals, such as in response to an external trigger, such as from a motion sensor, audio sensor, or other input.

Figure 6:
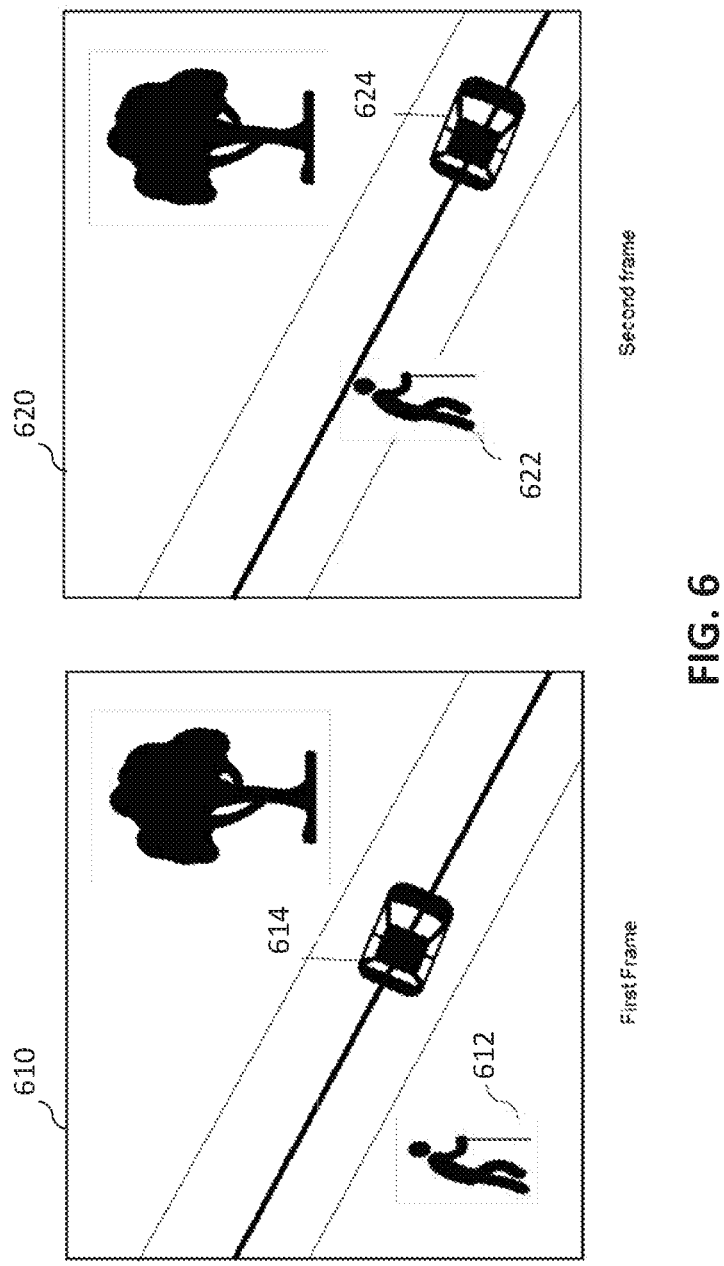
FIG. 6 illustrates generally an example of time-adjacent frames from a camera.

Various aspects of the method 400 are illustrated with reference to FIG. 6. FIG. 6 illustrates generally an example of time-adjacent frames from a camera, including a first frame 610 and a subsequent second frame 620. The first frame 610 includes a tree object at a first location, a human object at a second location 612, and a vehicle object at a third location 614. Any one or more of the objects can comprise a portion of a target area of the environment or scene represented in the frames.

Referring again to FIG. 4, at step 402, the method 400 can include constructing or updating a background model. In an example, a background model can include or use information about one or more features of an environment that is monitored by the camera. In an example, the one or more features can be static features (such as a large tree trunk, a building, or other fixed article in a field of view of the camera) or can be features that change position or location over time (such as tree leaves). In an example, step 402 can include analyzing the first frame 610 and/or the second frame 620 and determining that the tree object at the first location is a static object and that it can be considered part of a background. In an example, a street object can similarly be determined at step 402 to form a portion of a background. In an example, step 402 can include automatic scene learning to understand sizes and shapes of various objects. In an example, the method can be configured to learn locations where objects of specific classes can or cannot appear.

At step 403, the method 400 can include foreground extraction. Step 403 can include or use a processor circuit, such as including the object detector 108, to identify features of interest in the input frame received at step 401. Step 403 can include recognizing motion or movement of one or more objects, such as human beings, vehicles, or parcels, in time-adjacent frames and then designating such objects as belonging to a foreground.

Step 404 can include detecting one or more objects in the input frame and/or in the foreground identified at step 403. In an example, step 404 includes identifying discrete objects or regions in an image and flagging such objects for further analysis. For example, step 404 can include identify a tree object, a human object, a street object, and/or a vehicle object in one or more of the first and second frames 610 and 620.

The method 400 can optionally include, at step 405, tracking the one or more objects that were detected at step 404. For example, step 405 can include monitoring a travel path or direction of an identified human object or vehicle object or parcel object such as using information from multiple time-adjacent frames, such as received from the same camera or from different cameras. With reference to FIG. 6, for example, the human object is at the second location 612 in the first frame 610 and the human object is at a fourth location 622 in the second frame, and thus the human object can be determined to be moving. Similarly, the vehicle object is at the third location 614 in the first frame 610 and the vehicle object is at a fifth location 624 in the second frame 620, and thus the vehicle object can be determined to be moving.

In an example, steps 402-405 can include or use adaptive thresholding for pixel-based analysis, and can include or use information about pixel changes or variation over time to identify object motion or trajectory. In an example, steps 402-405 can include or use information about near frame differences and far frame differences. In near frame distances, time-adjacent frames are used, or frames separated by relatively short duration intervals, such as a few milliseconds, are used. In far frame distances, frames separated by longer intervals can be used, such as intervals lasting tens to hundreds of milliseconds. In an example, information determined about short term motion, such as motion occurring within a few hundred milliseconds or less, can be combined with information determined about longer term motion, such as motion occurring within about a half second or more. The combination of short and long term motion information can be useful to filter out motion "noise" such as due to blinking lights, fans, or other movements that can generally be discarded when the objective is to identify humans in an environment.

The method 400 can include, at step 406, classifying an object that was detected at step 404. Classifying the object can include or use a processor circuit to implement a machine learning-based classifier or algorithm to classify the detected objects and optionally to identify different characteristics of the objects. For example, a classifier can be configured to identify or discriminate human objects from pets or other moving objects. The same or another classifier can be configured to perform facial recognition or demographic feature recognition on identified human objects. At step 407, the method can include generating an event using information about the object, such as information about an object path from step 405, or information about a class to which the object belongs from step 406. In an example, step 407 includes storing information about the event in a database.

FIG. 5 illustrates generally an example of a method 500 that includes using a cost function to make associations between different candidate objects identified in an image or in a series of images. At step 501, the method 500 can include detecting an object in a first frame. The first frame can include information received from a first camera, such as one of the cameras 102b. In an example, detecting the first object can be performed using foreground extraction techniques, using information about detected movement or changes between time-adjacent frames (that is, frames received at different but temporally near times), or using a neural network-based classifier to analyze all or a portion of one or more frames and provide information about one or more objects or candidate objects in the first frame.

At step 502, the method 500 can include detecting multiple candidate objects in a second frame. The second frame can include information received from the same first camera as used to receive the first frame, or the second frame can include information received from a different camera. The second camera can be configured to monitor the same environment as that environment monitored by the first camera but from a different angle or having a different field of view. In an example, the first and second cameras monitor different environments. The candidate objects in the second frame can be detected using the same or different processing techniques than were used to identify the first object in the first frame.

At step 503, the method 500 can include computing a cost function between the first object and each of the multiple candidate objects from the second frame. In an example, the cost function can be based on a visual similarity or dissimilarity between the first object and the candidate objects. The visual similarity or dissimilarity can be based on, among other things, object shape, size, trajectory, color content, or other characteristics that can be derived from image data. In an example, the cost function can additionally or alternatively be based on a physical distance between the first object and the candidate objects. In an example, the cost function can additionally or alternatively be based on a difference between an expected location of the first object in the second frame relative to the location(s) of the candidate objects. Values corresponding to the cost functions can be computed and stored, such as in a two dimensional array in a memory circuit. An example of a two dimensional array that includes cost function information is illustrated generally in FIG. 7. The cost function information in FIG. 7 is arranged in a matrix or grid of columns C1 through C4 and rows R1 through R4. In an example, the various row-column pairs correspond to different regions of an image. For example, the value V_10 in cell (R1, C1) can indicate a high or maximum cost for a first region, whereas the value V_2 in cell (R4, C2) can indicate a relatively low or minimal cost for a second region. In an example, an object associated with the information in lower-valued cells can be considered to more be more closely associated with the target or original object, that is, such objects corresponding to the lower-valued cells can be more likely to be the same as or related to an object of interest such as in a preceding frame.

In an example, at step 504, a processor circuit such as the object detector 108 can select one or more pairs of the first object with the various candidate objects and, using the cost function information, can associate the first object with selected ones of the candidate objects. A relative value of the cost function can be used to provide an indication of a confidence or a likelihood that the first object is the same as one or more of the candidate objects.

Figure 8:
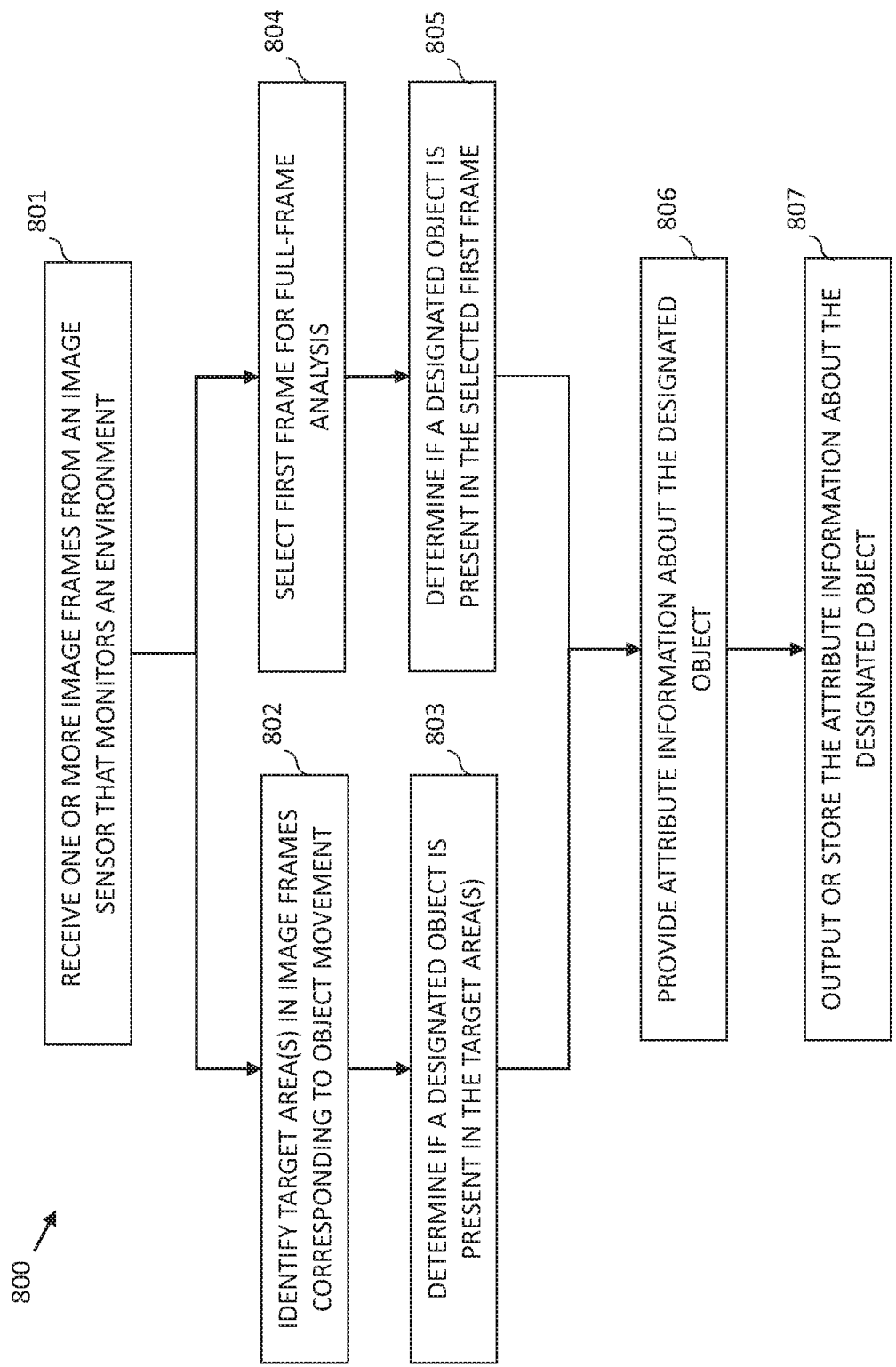
FIG. 8 illustrates generally an example of a method that can include determining whether a designated object is present in a monitored environment.

FIG. 8 illustrates generally an example of a method 800 that can include determining whether a designated object, such as a human object, a vehicle object, a parcel object, or other specified object, is present in a monitored environment. At step 801, the method 800 includes receiving one or more frames from an image sensor, or camera, that monitors an environment. In an example, the one or more frames can be provided by the same camera or by different cameras. In an example, the frames are received by the object detector 108.

At step 802, the method 800 can include identifying one or more target areas in the frames received at step 801. The target areas can be areas or regions in a frame that include objects at rest or objects in motion. In an example, the target areas can be predefined by a user or can be determined by a processor, such as using machine learning to determine or identify areas in frames that include objects in motion or are more likely to include objects in motion than other areas in the same frames. In an example, step 802 includes motion extraction processing, foreground/background processing, or machine learning-based analysis, such as using a neural network with a classification model, to determine whether a frame or frames include an object in motion. In an example, the classification model can be a generic classifier or can be tuned or configured for a particular type of classification. example, different classification models can be used for human detection or classification, or for vehicle detection or classification, or for parcel detection or classification.

At step 803, the method 800 can include determining if a designated object is present in the target areas identified at step 802. Step 803 can include using the object detector 108 to apply a neural network-based first classifier, such as a classifier that is trained on data about various designated object shapes or parts (e.g., human body shapes or human body parts). The first classifier can be applied using, or can receive input data that corresponds to, image information from the target areas identified in step 802. In this manner, less than an entire frame of information can be processed by the classifier, thereby saving time and processing cycles and power. That is, information from the target areas identified at step 802 can be provided to a classifier that is trained to recognize one or more designated objects, such as human bodies, vehicles, parcels, or parts thereof, and the classifier can provide a first indication about whether a designated object is present in the target area of the environment.

The method 800 can include, at step 804, selecting a first frame for full-frame analysis. Step 804 can include selecting the first frame from among the multiple frames received at step 801 or can include selecting a different frame. In an example, step 804 includes selecting one of the frames used in steps 802 and/or 803 to identify the target areas and/or to determine whether a designated object is present in the frame.

At step 805, the method 800 can include determining if a designated object, such as a human being, vehicle, or parcel, is present in the first frame (e.g., a full frame of image data) that was selected at step 804. Step 805 can include using the object detector 108 to apply a neural network-based second classifier, such as a classifier that is trained on data about various designated objects. The second classifier can be applied using, or can receive input data that corresponds to, image information from more than a target area (such as identified at step 802) and can optionally include using image information corresponding to an entire frame. In an example, specifically selected frames can be processed, without regard to detected areas of motion, to determine or confirm presence of a designated object in the environment. Different models or classification algorithms can be applied depending, for example, on a compute power available in a camera to optimize performance and depending on detection accuracy required, such as can be view-angle dependent.

At step 805, the information from the first frame is provided to the second classifier and the second classifier is trained to recognize designated objects, such as human bodies, vehicles, parcels, or parts thereof, and provide a second indication about whether a designated object is present in the environment. In an example, the first classifier used in step 803 and the second classifier used in step 805 are the same classifier, such as the same neural network-based classifier, such as using or applying the same classifier model(s). In an example, the first classifier used in step 803 is different from the second classifier used in step 805, for example, one or the other classifier can be more sensitive or can provide a greater confidence that the image information includes an individual. For example, in a method that includes human detection, one of the first and second classifiers can include a limb or extremity detector unit and the other of the classifiers can include only a more generic or higher level body or blob detector.

At step 806, the method 800 includes providing attribute information about the designated object in the environment monitored by the camera. The information can include a confidence that is determined using the first indication and the second indication provided at steps 803 and 805, respectively. In an example, the first and second indications can be differently weighted, such as according to a sensitivity or confidence provided by the respective classifier models used at steps 803 and 805.

Step 807 can include outputting or storing the attribute information about the designated object in the environment. In an example, stored information about the designated object can be later recalled or collected to provide a dashboard with information about a detected object, or about multiple detected objects over time, such as dwell time information, queue length information, demographic information, or other details about the object or about the environment that includes the object.

Figure 9:
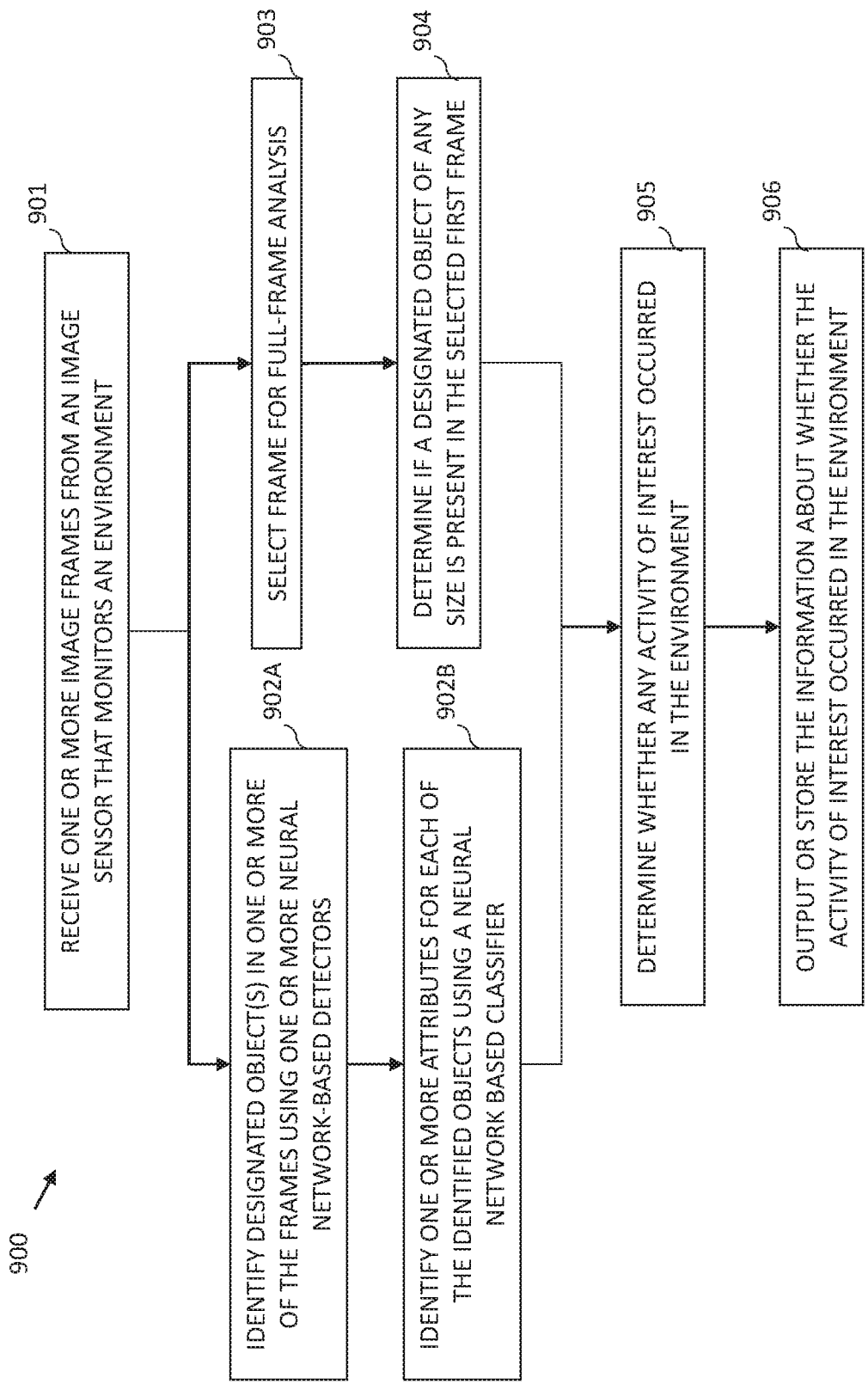
FIG. 9 illustrates generally an example of a method that can include determining whether an activity of interest is observed in a monitored environment.

FIG. 9 illustrates generally an example of a method 900 that can include determining whether an activity of interest is observed in a monitored environment. At step 901, the method 900 includes receiving one or more frames from an image sensor, or camera, that monitors an environment. In an example, the multiple frames are provided by the same camera or by different cameras. In an example, the frames are received by the object detector 108.

At step 902A, the method 900 can include determining if a designated object is present in one or more of the frames received at step 901, such as using one or more neural network-based classifiers, such as including a classifier that is trained on data about various human, vehicle, or parcel shapes or parts. Step 902A can include providing an indication about whether a designated object is present in the environment. At step 902B, the method 900 can include identifying one or more attributes for each of the identified objects.

Step 902B can be performed in whole or in part using the object detector 108. The classifier can be applied using, or can receive input data that corresponds to, image information from target areas of the frames (see, e.g., FIG. 8 at step 802) or can include image information for all of the frame, to provide attribute information about the identified objects. In an example, the same or different neural network-based classifier can be used at step 902B.

The method 900 can include, at step 903, selecting a first frame for full-frame analysis. Step 903 can include selecting the first frame from among the one or more frames received at step 901 or can include selecting a different frame. In an example, step 903 includes selecting one of the frames used in step 902.

At step 904, the method 900 can include determining if a designated object is, or designated objects are, present in the first frame that was selected at step 903. Step 904 can include using the object detector 108 to apply a neural network-based classifier, such as a classifier that is trained on data about various object shapes or parts. At step 904, the information from the first frame is provided to the second classifier and the classifier is trained to recognize designated objects and provide a second indication about whether a designated object is present in the environment. In an example, the classifiers used in step 902 and in step 904 can be the same classifier or different classifiers. In an example, the classifiers can have different sensitivities, can test for or identify different object types, shapes, or parts, or can be configured to provide different levels of confidence that the image information includes a designated object.

At step 905, the method 900 includes determining whether activity of interest occurred in the environment. In an example, the activity of interest can be a presence or absence of a designated object such as a particular individual (see, e.g., step 806 that describes using results from different neural network-based classifiers to determine whether a designated object is present in an environment). In an example, the activity of interest can be an activity performed by an individual, such as an individual being present in a particular portion of an environment (e.g., in a prohibited area) or an individual performing suspicious acts (e.g., opening a window or door to a restricted area).

Step 906 can include outputting or storing the information about whether the activity of interest occurred in the environment. For example, stored information about the an individual or activity can be later recalled or collected to provide a dashboard with information about a detected individual, or about multiple detected individuals over time, or about activities that transpired in the environment.

Figure 10:
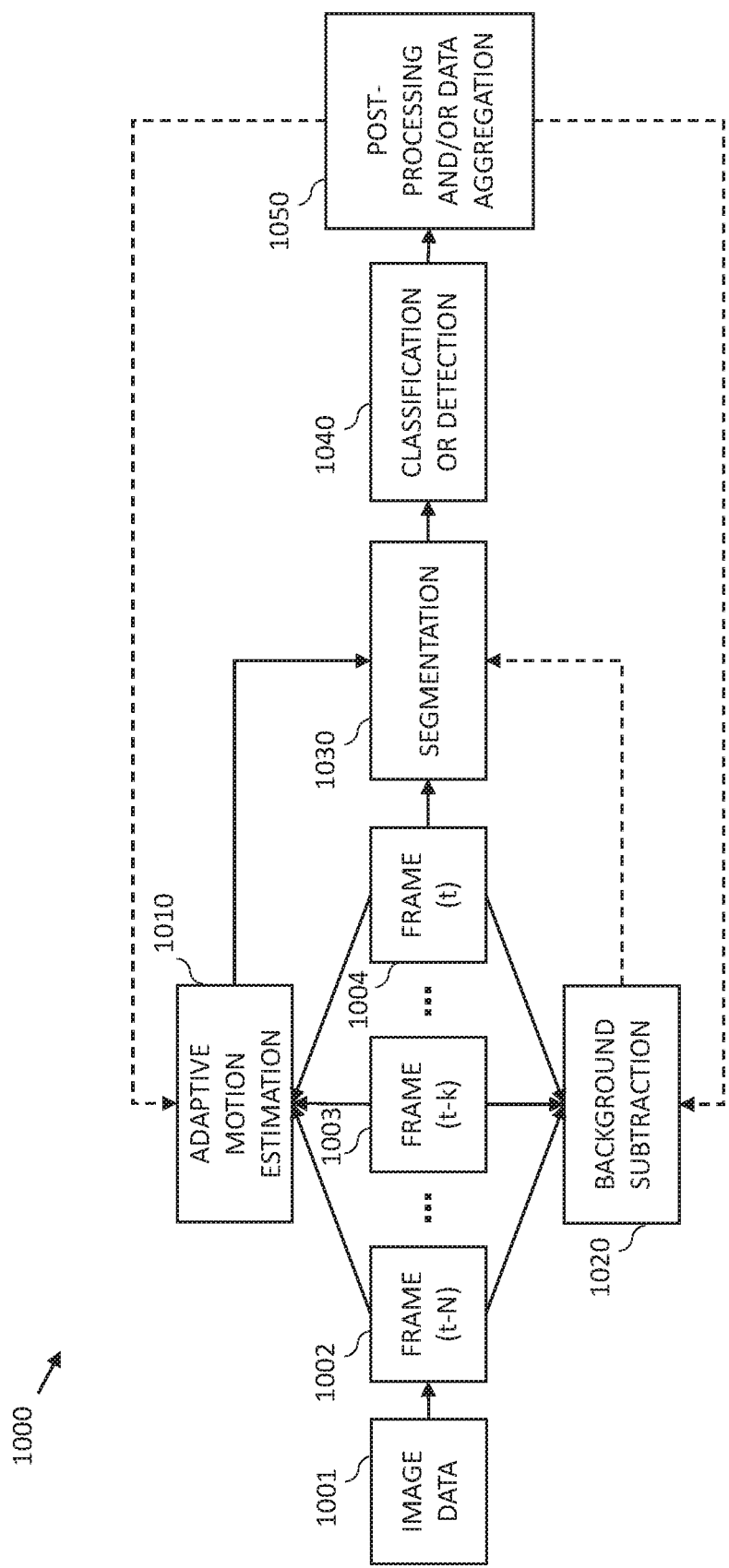
FIG. 10 illustrates generally an example of a schematic diagram that shows frame processing for use in object detection.

FIG. 10 illustrates generally an example of a schematic diagram 1000 that shows frame processing for use in object detection. In an example, the system 100 can be configured to perform the various steps and logical blocks illustrated in the diagram 1000.

At block 1001, image data can be acquired by a camera, such as by one or more of the cameras 102b. The image data can include a series of frames including a first frame 1002, a second frame 1003, and a third frame 1004. The series of frames can include frames received over a period of time and the same or different duration can elapse between acquisition of each frame.

Information from the series of frames can be provided to an adaptive motion estimation block 1010 and/or to a background subtraction block 1020. In the adaptive motion estimation block 1010, such as can be implemented by the object detector 108 and/or by another image processor circuit, any two or more of the frames from the series can be analyzed to determine if one or more objects in the frames represent, or are likely to represent, objects in motion. In the background subtraction block 1020, such as can be implemented by the object detector 108 and/or by another image processor circuit, the frames can be processed to subtract or remove background information. The background information can be predefined or known a priori by the system, or the background information can be determined by machine analysis of a series of frames to identify portions of the images that do not change, such as over long periods of time. In an example, one or both of the adaptive motion estimation and the background subtraction can be applied to the same or different frames.

In an example, information from the adaptive motion estimation block 1010 and information from the background subtraction block 1020 are used together in a segmentation block 1030. In the segmentation block, frame data can be parsed or analyzed to, e.g., remove background information or to isolate regions of motion. The parsed frame data can be further processed in a classification or detection block 1040. The classification or detection block 1040 can include or use a neural network-based classifier, such as trained on human, vehicle, or parcel attribute data, to provide an indication of whether regions of interest, such as in the parsed frame data, include or are likely to include a human, vehicle, parcel, or one or more parts thereof.

Block 1050 can include post-processing and/or data aggregation. The post-processing can include further classification, such as performing facial recognition, demographic analysis, or other processing on recognized humans. In an example, data aggregation can include storing information, such as information resulting from the processing in the classification or detection block 1040, for later presentation to a user, such as in a dashboard format.

Figure 11:
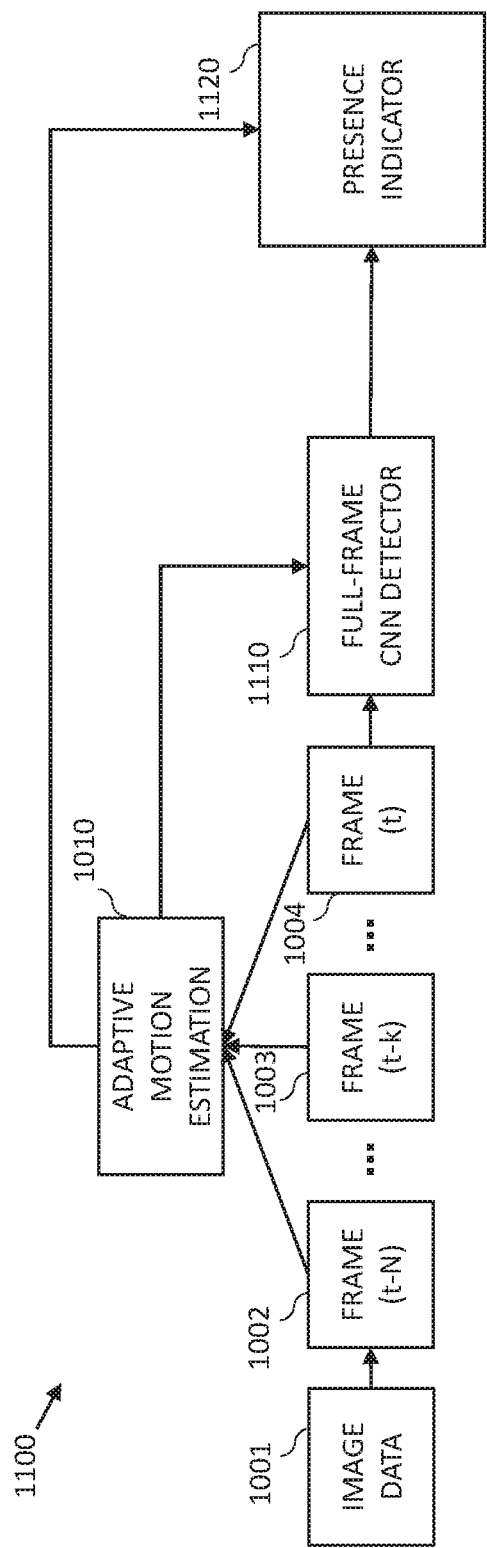
FIG. 11 illustrates generally an example of a schematic diagram that shows frame processing for use in object detection.

FIG. 11 illustrates generally an example of a second schematic diagram 1100 that shows frame processing for use in object detection. In an example, the system 100 can be configured to perform the various steps and logical blocks illustrated in the diagram 1100.

At block 1001, image data can be acquired by a camera, such as by one or more of the cameras 102b. The image data can include a series of frames including a first frame 1002, a second frame 1003, and a third frame 1004. The series of frames can include frames received over a period of time and the same or different duration can elapse between acquisition of each frame.

Information from the series of frames can be provided to an adaptive motion estimation block 1010. In the adaptive motion estimation block 1010, such as can be implemented by the object detector 108 and/or by another image processor circuit, any two or more of the frames from the series can be analyzed to determine if one or more objects in the frames represent, or are likely to represent, objects in motion.

Information from the adaptive motion estimation block 1010 can be shared. with one or both of a full-frame CNN detector block 1110 and a presence indicator block 1120. In an example, the full-frame CNN detector block 1110 is configured to receive one or more of the frames from the series of frames and apply a neural network-based classifier to provide information about whether a designated object s detected anywhere in the frame. In an example, information from the adaptive motion estimation block 1010, such as including information about regions of interest for further processing, can be provided to the full-frame CNN detector block 1110. Since the full-frame CNN detector block 1110 operates on a full frame of data, the information from the adaptive motion estimation block 1010 can be used as a trigger or indication that the processing resources to perform a full-frame analysis are warranted for a particular frame and that the full-frame CNN detector block 1110 should perform its analysis.

Block 1120 includes a presence indicator. In an example, the presence indicator block 1120 generates an indication of a likelihood that a designated object is present in an environment monitored the cameras 102b. The indication can include information from the adaptive motion estimation block 1010 about whether motion was detected, and optionally information about a type or kind of motion (e.g., rate of motion, direction of motion, area of a frame in which motion occurs, etc.), and the indication can include information from the full-frame CNN detector block 1110 about its neural network-based result of whether a designated object was detected in a particular full frame of interest. The presence indicator block 1120 can differently weight the information from the other blocks in providing its presence indication.

The various systems and methods discussed herein can further include systems, algorithms, methods, or processes that can extract data elements from image or video data, such as indications of designated object presence, absence, or other object attributes. The data elements can be collected over time and can be analyzed and presented to a user in the form of a report such as a chart or dashboard. The report can include or represent any operational intelligence or report about an environment such as a place of business, a public or private building, a home or retail store, or other location. The reports can be interactive and can be generated or served from a web cloud server or locally from a PC or an edge device such as a camera. In an example, a report can be generated by one or more devices comprising the system 100, such as at one of the cameras 102b, at the computer system 106, or at the object detector 108. Data or metadata used to generate a report can be stored in the respective systems or in the video/image archive 104.

In an example, image information can include metadata with information about one or more objects in or characteristics of the image. In an example, the metadata can be provided as a result of a neural network-based or other image recognition analysis as described herein. In an example, the metadata can include information about a dwell time (e.g., how long an individual stood or an object rested at a particular place or location), an object count (e.g., how many objects reside in a defined area or zone by time), an object demographic (e.g., how many of the recognized individuals or bodies are male or female or have other characteristics), whether a particular activity was observed (e.g., an individual standing or facing a particular display area in a store), a waiting time or queue length, or more. The metadata can be collected and reported automatically to a user.

In an example, a dashboard or report can include a chart that shows events or occurrences over time. For example, a dashboard can be generated based on information from a front door camera. The dashboard can include a chart that shows times of day at which an individual was detected at the door and, optionally, a wait or dwell time at the door. In an example, the chart can include flags that indicate whether particular activities were detected, such as a mail or package delivery, a bell ring, or other activity. The dashboard can be adjusted by a user to show a particular time interval or activity.

In an example, a human count report can be generated. Based on information from one or more of the cameras 102b, one or more individuals or humans can be identified in an environment over time such as using the object detector 108. The number of individuals identified can be counted at different instances of time, such as corresponding to different frames or groups of frames of image data. In an example, the report can include information about a direction of travel of individuals in the environment, and can optionally include information about individuals who enter or exit the environment. In an example, the report can be used to determine an occupancy in an environment at a particular time.

In an example, a demographic report can be generated. The demographic report can be generated using information about one or more humans in an environment such as determined by the object detector 108. In an example, the object detector 108 is configured to perform facial recognition or to look for other clues or features to classify an individual by gender. In an example, the object detector 108 is configured to determine or estimate an age of each individual in the environment. In an example, the system is configured to determine gender information using different machine learning networks for different age groups. In an example, the system is configured to determine information about an individual's emotional state using information from a face. In an example, the system is configured to determine the emotion information using different machine learning networks for different age groups. The demographic report can include information about the genders, ages, emotions, or other aspects determined about the individuals in the environment.

In an example, a dwell time or service time report can be generated using information from the object detector 108. In an example, the object detector 108 is configured to identify individuals in an environment and their respective relative or absolute locations in the environment. The system can be configured to determine a waiting or dwelling time for each individual in each location, such as using motion information and other clues to determine how long an individual is in a location. In an example, a report about such waiting or dwelling time can include information about a start time or end time that an individual is detected or recognized in an environment. In an example, the system can analyze specified areas or regions of an environment and determine if a line or queue of individuals is present. The system can be configured to monitor the dwell time of the individuals in the queue to determine a wait time.

In an example, a heat map can be generated using information from the object detector 108. A heat map can include a pictorial representation of an occupancy that is typically color-coded to show areas of greater or lesser occupancy over time. For example, a heat map can be used together with, or generated from, dwell time or wait time information. In an example, a heat map can include information about how many individuals are present in each of one or more regions over time, and can use different colors to show a count of individuals and an amount of time spent by each individual (or by a group of individuals) in the one or more regions.

The various reports, maps, charts, dashboards, and other information can be stored or reported to a user. In an example, the information can be presented in the form of bar graphs or line charts, pie charts, or other pictorial representations. The information can be used by business operators, security personnel, homeowners, or others interested in learning more about occupancy or behaviors in various environments.

Figure 12:
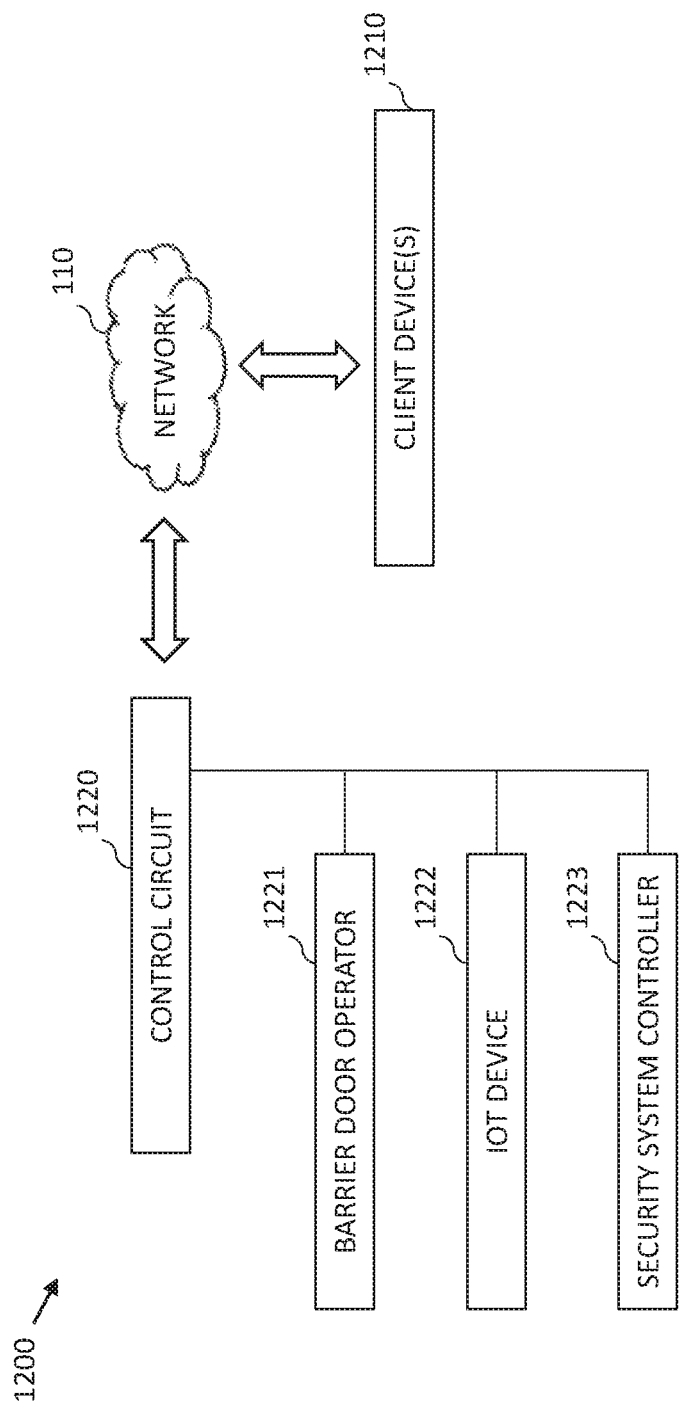
FIG. 12 illustrates generally an example of a system that can include a control circuit for a barrier door.

FIG. 12 illustrates generally an example of a system 1200 that can include a control circuit 1220 for a barrier door. The control circuit 1220 can be coupled to various other circuits or devices to carry out functions related to a barrier door. In an example, a barrier door includes one or more of a garage door, gate, or other physical barrier or movable obstruction. In an example, the control circuit 1220 can be coupled to a barrier door operator 1221, such as can include a garage door or gate operator device. The barrier door operator 1221 can be configured to automatically open, close, lock, unlock, or change a characteristic of a door or barrier in response to a triggering event. The triggering event can include a command from the control circuit 1220, such as in response to a user input, the command can be transmitted to the barrier operator device via a wired or wireless medium.

In an example, the barrier door operator 1221 includes an electromechanical device configured to raise and lower (open and close, etc.) a door in response to a command signal. The command signal can be an electrical pulse signal transmitted to the door operator by way of a pushbutton switch through physical wires, or the command signal can be a radio signal transmitted by way of a battery-operated remote control. The command signal can be received at the control circuit 1220 and the control circuit 1220 can initiate movement of a door to a state that is opposite from a state in which the door resides when the command signal is received. That is, if the door is open, then the command signal can cause the control circuit to close the door, and if the door is closed, then the command signal can cause the control circuit to open the door.

In an example, the control circuit 1220 is coupled to an internet of things (IOT) device 1222. In an example, the IOT device can include one or more of a sensor, a smart speaker or other audio reproduction device or microphone, or other device configured to monitor information and process or report the information. In an example, the control circuit 1220 can condition commands for the barrier door operator 1221 based on information from the IOT device 1222.

In an example, the control circuit 1220 is coupled to a security system controller 1223 or other home automation controller. Home automation or electronic security systems can be used to control or monitor electronic devices around a home. For example, a home automation system can use a wired or wireless network to communicate with one or more appliances, utilities, sensors, displays, or other devices using a home automation protocol. Many electrical and electronic appliances in a home have programmable and network-ready circuitry and interfaces, and such appliances can be connected to a home network for use in controlling a home environment. For example, lighting, temperature, sound, automatic doors, or other characteristics of the home environment can be updated or changed using the system or using the control circuit 1220. Some commercially available network systems use a proprietary protocol to interface devices with an automation system to control various devices.

In an example, the control circuit 1220 is coupled to the network 110. Using the network 110, the control circuit 1220 can issue commands or information to, or can receive commands or information from, one or more of the streaming system 102, the computer system 106, the object detector 108, or a client device 1210. In an example, a client device 1210 can include a computer, mobile phone, tablet, smart device, or other network-connected device with which a user can receive information from the network 110, or provide information to the network 110. In an example, the client 1210 includes a display that can be used to remotely view information from the streaming system 102.

Figure 13:
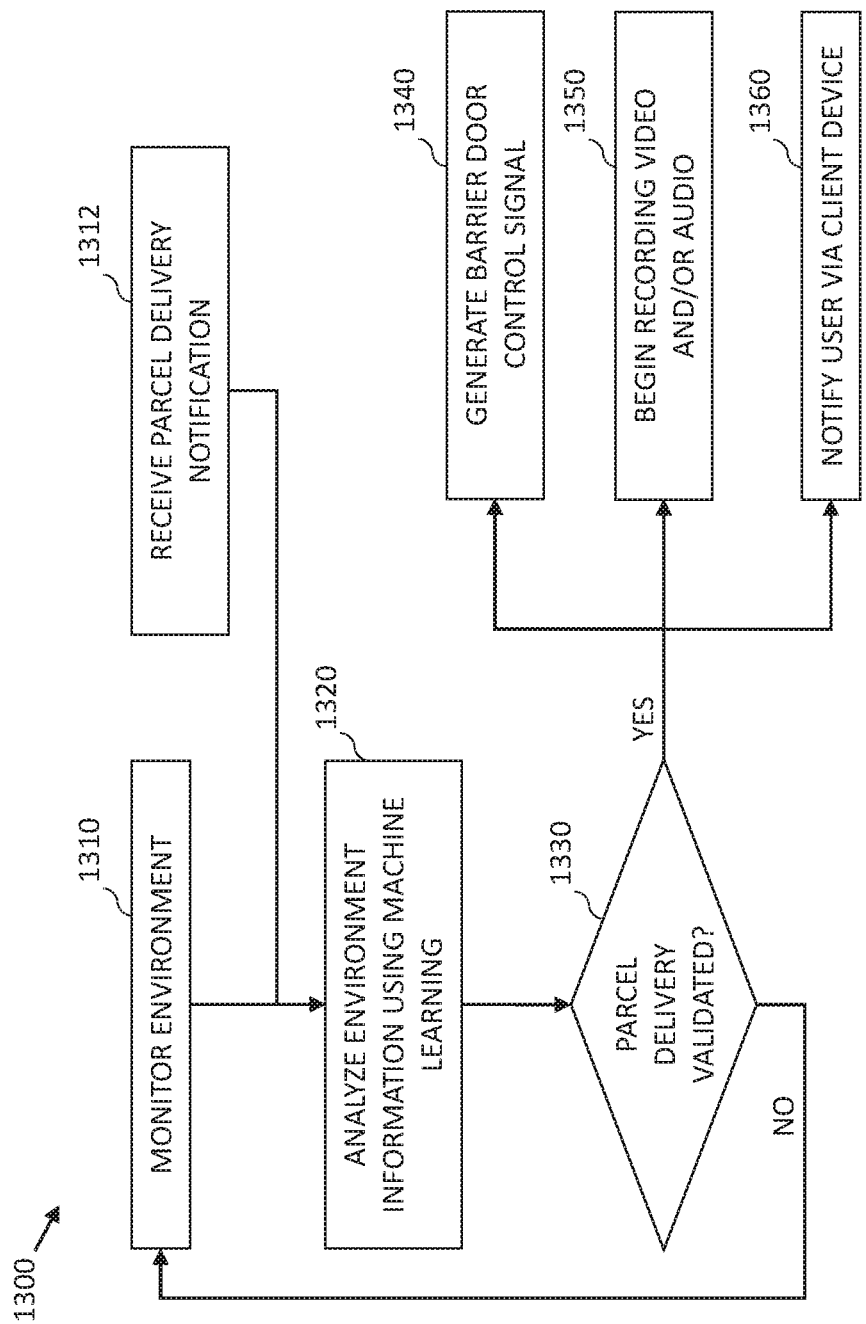
FIG. 13 illustrates generally an example of a method that can include generating a barrier door control signal.

FIG. 13 illustrates generally an example of a method 1300 that can include generating a barrier door control signal. In an example, the barrier door control signal can be generated automatically or manually and provided to the control circuit 1220 to thereby command the barrier door operator 1221 to take a particular action.

In an example, the method 1300 includes monitoring an environment at step 1310. Monitoring the environment at step 1310 can include receiving one or more frames from an image sensor, or camera, that monitors the environment. In an example, the one or more frames can be provided by the same camera or by different cameras. In an example, the frames are received by the object detector 108.

At step 1312, the method 1300 can include receiving a parcel delivery notification. In an example, the control circuit 1220 can receive the parcel delivery notification. In an example, the parcel delivery notification includes, among other things, an electronic message with information about a parcel that is en route to, or expected to be received at, a particular physical location or address. Various information can be included in, or can accompany, a parcel delivery notification. For example, the parcel delivery notification can include information about the object or goods to be delivered, or can include an expected delivery time or date or location. In an example, the parcel delivery notification includes an image of the parcel, or dimension or other attribute information about the parcel such as weight, color, shape, or other information. The parcel delivery notification can include information about the source or the transporter of the parcel. In an example, the parcel delivery notification can include information about the vehicle or type of vehicle that will be or may be used to transport the parcel to the destination.

In an example, the parcel delivery notification can be provided, such as to the control circuit 1220, by one or more sources. In an example, a delivery driver, a mobile device associated with a delivery driver, a vehicle system, a dispatcher, a dispatch system, an e-commerce supplier, or other system or device in a supply chain can generate and provide the parcel delivery notification to the control circuit 1220. In an example, the parcel delivery notification can be provided by a parcel delivery partner or carrier, such as UPS, FedEx, DHL, Amazon, a national postal service, or other entity. The parcel delivery notification can be received at the control circuit 1220 using, for example, the network 110. In an example, the control circuit 1220 can receive the parcel delivery notification via one or more other receivers, sensors, or other devices coupled to the control circuit 1220.

At step 1320, the method 1300 can include analyzing the environment using machine learning. In an example, step 1320 includes or uses the control circuit 1220 and/or the object detector 108 to perform the environment analysis, such as using image-based information. The analysis at step 1320 can optionally be performed at an edge device, such as at a processor circuit on-board a camera, or can be performed by a centralized or networked processor circuit. In an example, the analysis at step 1320 can include neural network-based processing of image information to identify whether a designated object, such as a human, vehicle, or parcel, is present in the environment. In an example, the analysis at step 1320 can include or use the parcel delivery notification received at step 1312.

At step 1330, the method 1300 includes determining whether a parcel delivery is valid. For example, step 1330 can include using the control circuit 1220 to identify a correspondence between information in the parcel delivery notification received at step 1312 and the image-based information from the environment. For example, the control circuit 1220, or other processor circuit, can determine whether an actual parcel visually detected or determined to be in the environment matches an expected parcel as described by the parcel delivery notification.

In an example, one or more of steps 1320 and 1330 can include or use the method 800 to determine whether a designated object, such as a human object, a vehicle object, a parcel object, or other specified object, is present in the environment. In an example, one or more of steps 1320 and 1330 can additionally or alternatively include or use the method 900 to determine whether an activity of interest is observed in the environment.

If the parcel delivery is not validated at step 1330, then the method 1300 can return to step 1310 to continue monitoring the environment. If the parcel delivery is validated at step 1330, then the method 1300 can continue to one or more of step 1340, step 1350, or step 1360. One or more other steps can additionally or alternatively be performed.

At step 1340, the method 1300 can include generating a barrier door control signal. Step 1340, for example, can include using the control circuit 1220 to issue a command to the barrier door operator 1221. In an example, the control circuit 1220 can issue a command to open a barrier door, such as by a specified opening amount. In an example, the specified opening amount can correspond to a shape or size of the parcel described by the parcel delivery notification.

At step 1350, the method 1300 can include recording video and/or audio information from the environment. In an example, step 1350 includes using the same camera to record video information as is used at step 1310 to monitor the environment. In an example, step 1350 includes using a different camera, such as can be configured to monitor the same or other portion of the environment. For example, a first camera configured to monitor an exterior doorway can be used at step 1310 to monitor the environment, and a different second camera configured to monitor an interior doorway can be used at step 1350 to further monitor the environment, such as when a parcel delivery event is underway. In an example, the video recording can be stored locally or remotely. In an example, the video can be accessed by the client device 1210.

At step 1360, the method 1300 can include notifying a user about a delivery event. Step 1360 can include issuing a notification to a user via the client device 1210. The notification can include, among other things, an invitation to access a live or recorded video feed from the environment, so that the user can remotely view the delivery event.

Figure 14:
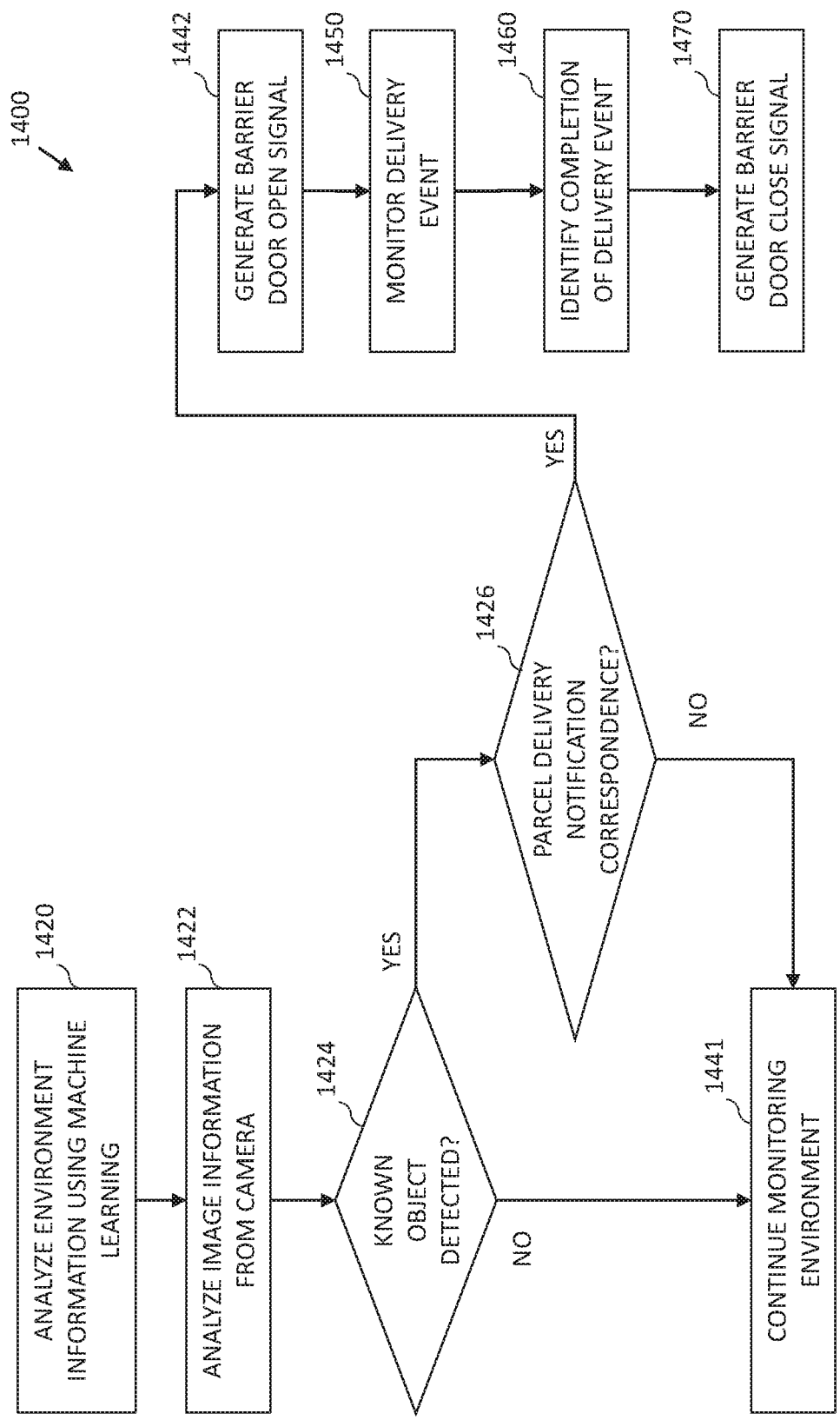
FIG. 14 illustrates generally an example of a method that can include monitoring a parcel delivery event.

FIG. 14 illustrates generally an example of a method 1400 that can include monitoring a parcel delivery event. The method 1400 can begin at step 1420 with analyzing the environment using machine learning. In an example, step 1420 can include or use Step 1320 as described above in the discussion of FIG. 13.

At step 1422, the method 1400 includes analyzing image information from a camera, such as a camera coupled to the streaming system 102. Analyzing the image information at step 1422 can include using the object detector 108 to determine whether a designated object, such as a human, vehicle, or parcel, is detected in a monitored environment. In an example, step 1422 includes using the object detector 108 to identify features or attributes of one or more objects in the environment.

Step 1424 can include determining whether a known object is detected in the environment. In an example, the object detector 108 can be used to determine whether a human detected at step 1422 is a known human or known personnel, such as can be associated with a parcel delivery notification. In an example, the object detector 108 can be used to determine whether a vehicle detected at step 1422 corresponds to an expected vehicle, such as can be associated with a parcel delivery notification. In an example, the object detector 108 can be used to determine whether a parcel detected at step 1422 corresponds to an expected parcel, such as can be associated with a parcel delivery notification. If, at step 1424, a known object is not detected in the environment, then the method 1400 can continue to step 1441 to continue monitoring the environment. If, at step 1424, a known object is detected in the environment, then the method 1400 can continue to step 1426 for further analysis.

Step 1426 can include determining whether the known object, as identified at step 1424, corresponds with a parcel delivery notification. The parcel delivery notification can include, among other things, details or attributes about a parcel itself or about a delivery vehicle or about delivery personnel for a parcel. In an example, step 1426 includes determining whether a shape of a parcel, such as a parcel identified at step 1422, corresponds with a shape of a parcel as provided by the parcel delivery notification. In an example, step 1426 includes determining whether delivery personnel, such as identified at step 1422, corresponds with expected delivery personnel as provided by the parcel delivery notification.

If, at step 1426, a correspondence is not found between the known object and the parcel delivery notification, then the method 1400 can continue to step 1441. If, at step 1426, a correspondence is found between the known object and the parcel delivery notification, then the method 1400 can continue to step 1442.

Step 1442 can include generating a barrier door open signal. Step 1442 can include using the control circuit 1220 to issue a command to the barrier door operator 1221. In an example, the command includes information about a particular barrier door to operate or includes information about an extent to which a barrier door is to be opened. For example, the command can instruct the barrier door operator 1221 to open a barrier door only enough to permit entry of the parcel and to inhibit or prevent entry of other objects or personnel.

Following step 1442, the method 1400 can include monitoring a delivery event at step 1450. Step 1450 can include, for example, receiving or recording video and/or audio information from the environment. In an example, step 1450 includes using the same camera to receive video information as is used to monitor the environment and identify a parcel being delivered. In an example, step 1450 includes using a different camera, such as can be configured to monitor the same or other portion of the environment. In an example, step 1450 can include initiating a tinier for the delivery event. In an example, the barrier door operator 1221 can include or use the timer to determine when to open or close a barrier door. For example, in response to an instruction at step 1442 to open a barrier door, a timer can begin for an expected duration of the delivery event. When the timer expires, then the method 1400 can continue to step 1460 or step 1470. In an example, step 1450 can include monitoring another delivery area sensor. For example, a weight sensor or presence sensor can be used to determine whether a parcel is placed in a designated location. When the sensor indicates a parcel is present, then the method 1400 can continue to step 1460 or step 1470.

At step 1460, the method 1400 can include identifying a completion of a delivery event. At step 1460, one or more sensors or information from a camera can be used to determine that the parcel has been delivered and/or the parcel has been received. For example, step 1460 can include using the object detector 108 to verify that a parcel is placed behind a barrier door. In an example, step 1460 can include identifying a timer, such as initiated at step 1450 or earlier, has elapsed. In an example, step 1460 can include using the object detector 108 to determine if delivery personnel or a delivery vehicle is retreating from the delivery area. In an example, step 1460 can include using the object detector 108 to identify a delivery vehicle departing from the environment. In an example, step 1460 can include using the control circuit 1220 or the barrier door operator 1221 to detect a button push, such as can be provided by delivery personnel.

Step 1470 can include generating a barrier door close signal. Step 1470 can include using the control circuit 1220 to issue a command to the barrier door operator 1221. In an example, the command includes information about a particular barrier door to operate or includes information about an extent to which a barrier door is to be closed.

Figure 15:
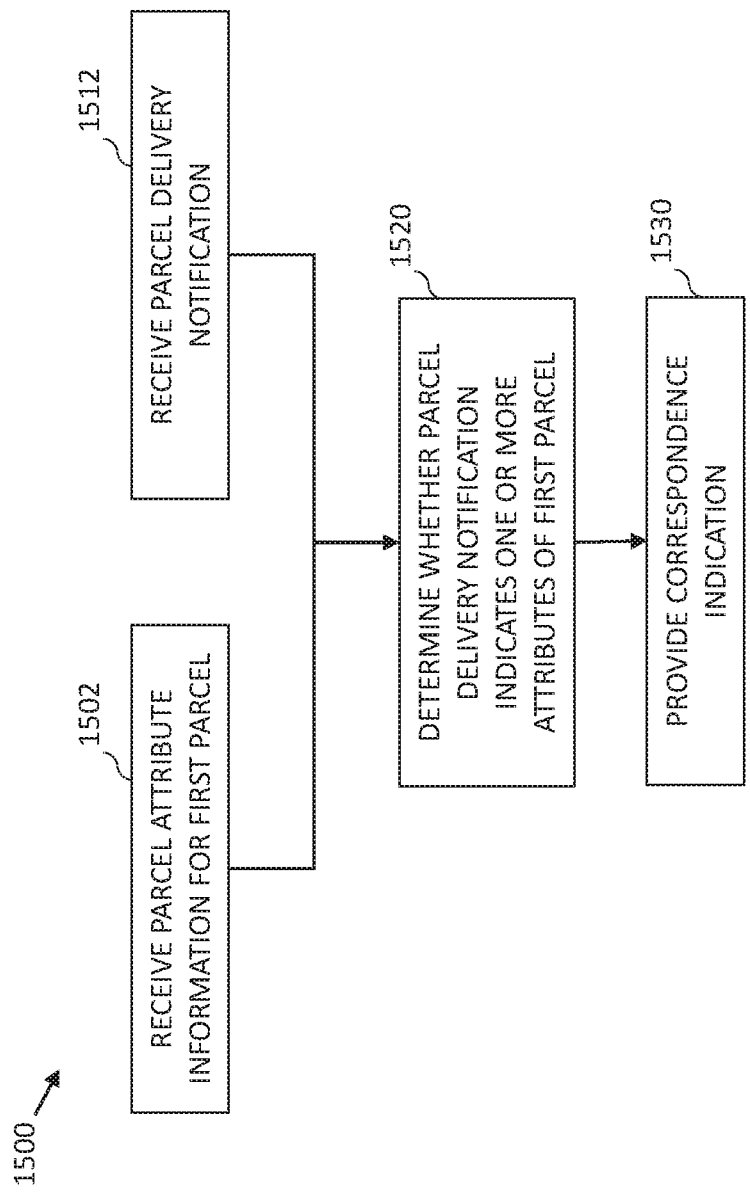
FIG. 15 illustrates generally an example of a method that can include providing a correspondence indication between parcel attribute and a delivery notification information.

FIG. 15 illustrates generally an example of a method 1500 that can include providing a correspondence indication between parcel attribute for a first parcel and delivery notification information for the same first parcel. In an example, the method 1500 can be performed using the control circuit 1220 or using another processor or device coupled to the network 110.

At step 1502, the method 1500 can include receiving or determining parcel attribute information for the first parcel. In an example, the parcel attribute information can be determined by or received from a machine learning-based or neural network-based detector, such as the object detector 108. In an example, the parcel attribute information can include, among other things, dimensional information, color or design information, shape information, code information, carrier or delivery driver information, vehicle information, or other information.

Step 1512 can include receiving a parcel delivery notification for the first parcel. In an example, step 1512 can include or use step 1312 which similarly includes receiving a parcel delivery notification.

Step 1520 can include determining whether the parcel delivery notification received at step 1512 corresponds to an attribute of the first parcel as identified at step 1502. For example, step 1520 can include determining whether information from the parcel delivery notification, such as a parcel size, shape, identification code, delivery timing, delivery personnel, or other information, corresponds to one or more of the received parcel attributes for the first parcel at step 1502. At step 1530, information about the correspondence can be provided, such as to or from the control circuit 1220, for use in determining when or whether or provide a command to the barrier door operator 1221.

Figure 16:
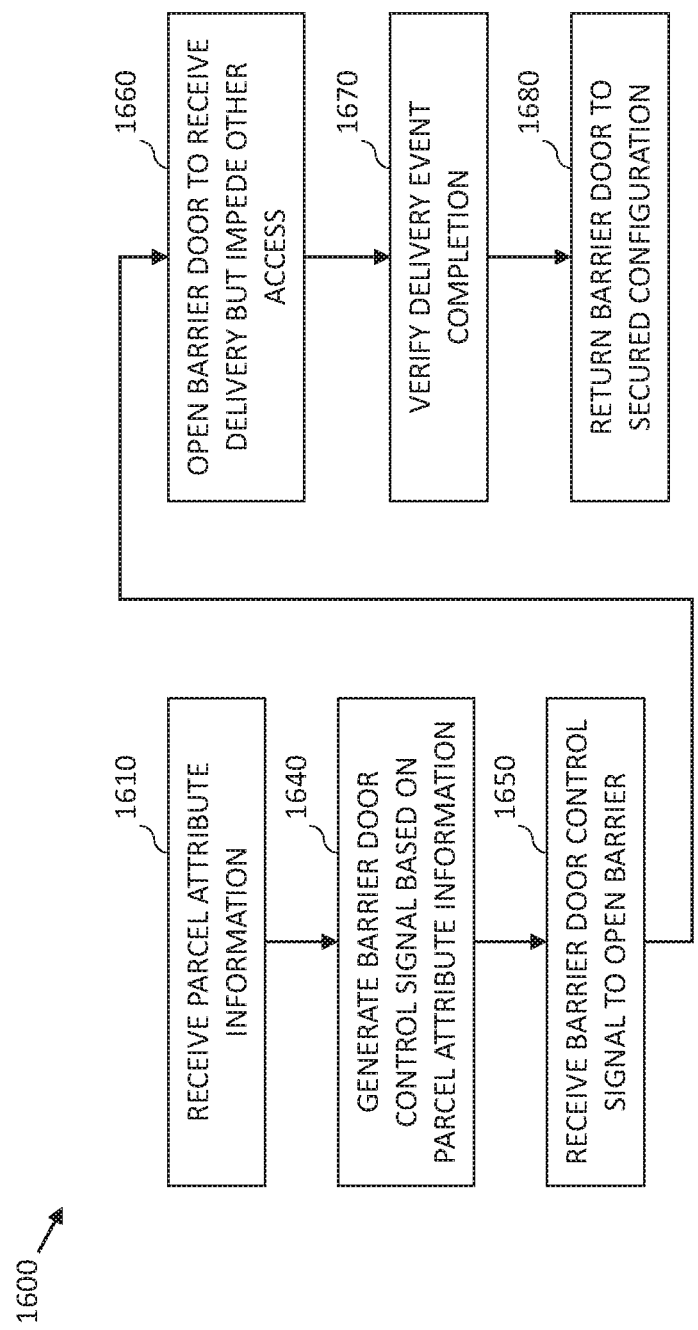
FIG. 16 illustrates generally an example of a method that can include operating a barrier door.

FIG. 16 illustrates generally an example of a method 1600 that can include operating a barrier door. At step 1610, the method 1600 can include receiving parcel attribute information at the control circuit 1220. In an example, the parcel attribute information received at step 1610 can be based on information from a parcel delivery notification or can be visually determined using information received from one or more cameras monitoring an environment.

Step 1640 can include generating a barrier door control signal based on the parcel attribute information received at step 1610. In an example, the control circuit 1220 can generate the barrier door control signal. For example, the control circuit 1220 can issue a command to the barrier door operator 1221.

Step 1650 can include receiving, at the barrier door operator 1221, a signal to open the barrier door. Step 1660 can include operating or opening the barrier door, such as using the barrier door operator 1221. Step 1660 can include opening the barrier door by a specified opening amount. In an example, the specified opening amount can correspond to a shape or size of the parcel described by the parcel delivery notification.

Step 1670 can include verifying completion of a delivery event. At step 1670, one or more sensors or information from a camera can be used to determine that a parcel has been delivered and/or a parcel has been received. For example, step 1670 can include using the object detector 108 to verify that a parcel is placed behind a barrier door.

At step 1680, following the verified completion of the delivery event at step 1670, the method 1600 can conclude with returning the barrier door a secured configuration, such as a fully closed door position. Step 1680 can include receiving, at the barrier door operator 1221, a signal to close the barrier door, and can include operating or closing the barrier door using the barrier door operator 1221.

Figure 17:
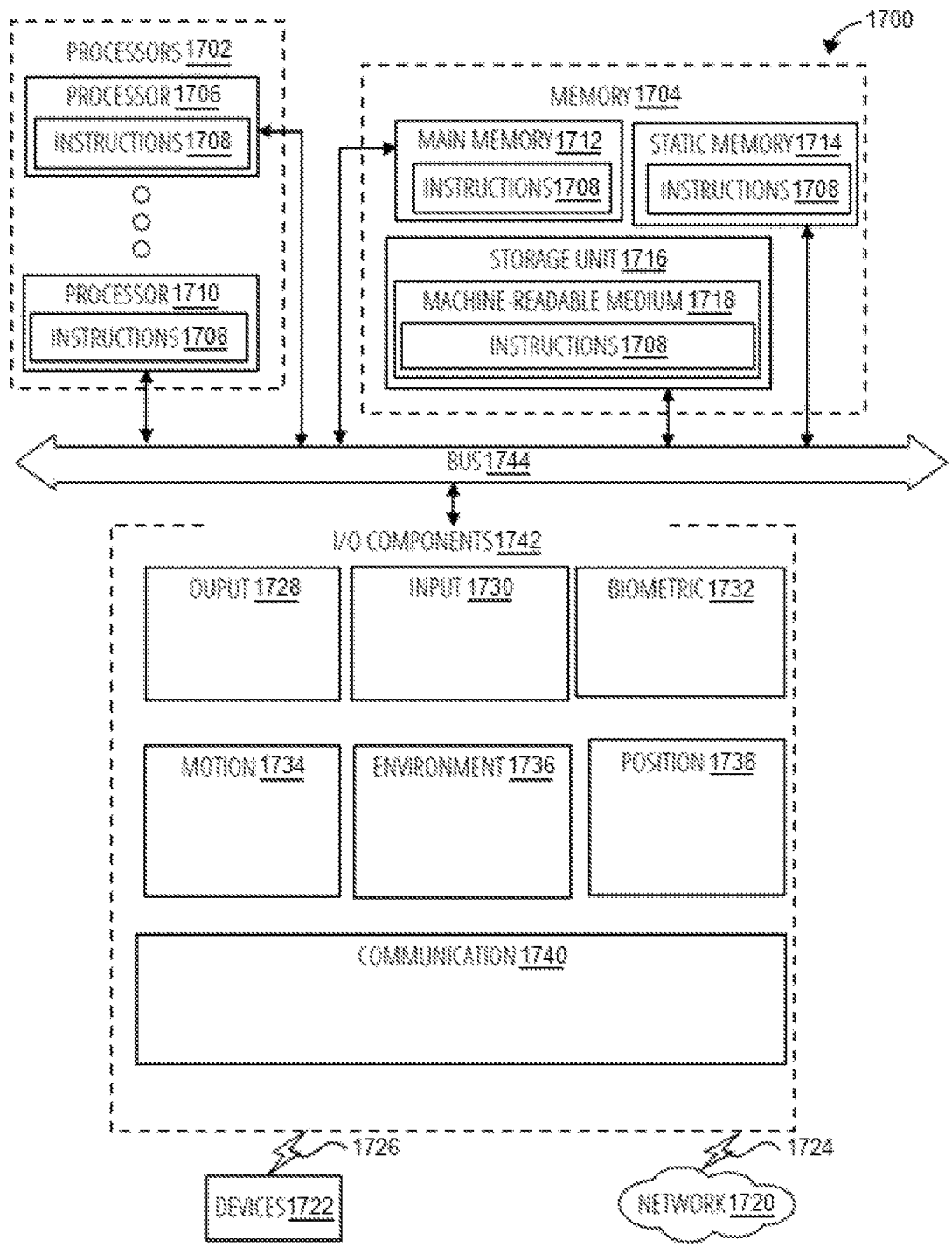
FIG. 17 illustrates generally an example of a machine in the form of a computer system within which a set of instructions can be executed to cause the machine to perform any one or more of the methods discussed herein.

FIG. 17 illustrates generally an example of a machine 1700 in the form of a computer system within which instructions 1708 can be executed to cause the machine to perform any one or more of the methods discussed herein. In an example, the machine 1700 comprises a portion of the system 100, or one or more portions of the system 100 comprise an instance of the machine 1700. The instructions 1708 can include software, a program, an application, an applet, an app, or other executable code that causes or configures the machine 1700 to perform any one or more of the methods discussed herein, or portions of such methods. For example, the instructions 1708 can cause the machine 1700 to execute any one or more of the methods described herein. The instructions 1708 transform a general, non-programmed machine into a particular machine configured or programmed to carry out the described and illustrated functions.

The machine 1700 can operate as a standalone device or can be coupled (e.g., networked) to other machines. In a networked deployment, the machine 1700 can operate in the capacity of a server machine or a client machine in a server-client network environment, or as a peer machine in a peer-to-peer (or distributed) network environment. The machine 1700 can comprise, but not be limited to, a server computer, a client computer, a personal computer (PC), a tablet computer, a. laptop computer, a netbook, a set-top box (STB), a PDA, an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1708, sequentially or otherwise, that specify actions to be taken by the machine 1700. Further, while only a single machine 1700 is illustrated, the term "machine" shall also be taken to include a collection of machines that individually or jointly execute the instructions 1708 to perform any one or more of the methodologies discussed herein.

The machine 1700 can include processors 1702, memory 1704, and I/O components 1742, which can be configured to communicate with each other via a bus 1744. In an example, the processors 1702 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (MC), another processor, or any suitable combination thereof) can include, for example, a processor 1706 and a processor 1710 that execute the instructions 1708. The term "processor" is intended to include multi-core processors that can comprise two or more independent processors (sometimes referred to as "cores") that can execute instructions contemporaneously. Although FIG. 12 shows multiple processors 1702, the machine 1700 can include a single processor with a single core, a single processor with multiple cores (e.g., a multi-core processor), multiple processors with a single core, multiple processors with multiples cores, or any combination thereof.

The memory 1704 includes a main memory 1712, a static memory 1714, and a storage unit 1716, both accessible to the processors 1702 via the bus 1744. The main memory 1704, the static memory 1714, and storage unit 1716 store the instructions 1708 embodying any one or more of the methodologies or functions described herein. The instructions 1708 can also reside, completely or partially, within the main memory 1712, within the static memory 1714, within machine-readable medium 1718 within the storage unit 1716, within at least one of the processors 1702. (e.g., within the processor's cache memory), or any suitable combination thereof, during execution thereof by the machine 1700.

The I/O components 1742 can include a wide variety of components to receive input, provide output, produce output, transmit information, exchange information, capture measurements, and so on. The specific I/O components 1742 that are included in a particular machine will depend on the type of machine. For example, portable machines such as mobile phones can include a touch input device or other such input mechanisms, while a headless server machine will likely not include such a touch input device. It will be appreciated that the I/O components 1742 can include many other components that are not shown in FIG. 12. In various example examples, the I/O components 1742 can include output components 1728 and input components 1730. In an example, the I/O components 1742 include one or more of the cameras 102b. The output components 1728 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1730 can include one or more cameras, alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example examples, the I/O components 1742 can include biometric components 1732, motion components 1734, environmental components 1736, or position components 1738, among a wide array of other components. For example, the biometric components 1732 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1734 include acceleration sensor components (e.g., accelerometer), gravitation sensor components, rotation sensor components (e.g., gyroscope), and so forth.

The environmental components 1736 can include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that can provide indications, measurements, or signals corresponding to a surrounding physical environment. The position components 1738 can include location sensor components (e.g., a GPS receiver component), altitude sensor components (e.g., altimeters or barometers that detect air pressure from which altitude can be derived), orientation sensor components (e.g., magnetometers), and the like.

Communication can be implemented using a wide variety of technologies. The I/O components 1742 further include communication components 1740 operable to couple the machine 1700 to a network 1720 or devices 1722 via a coupling 1724 and a coupling 1726, respectively. For example, the communication components 1740 can include a network interface component or another suitable device to interface with the network 1720. In further examples, the communication components 1740 can include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1722 can be another machine or any of a wide variety of peripheral devices (e.g., a peripheral device coupled via a USB).

Moreover, the communication components 1740 can detect identifiers or include components operable to detect identifiers. For example, the communication components 1740 can include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information can be derived via the communication components 1740, such as location via Internet Protocol (IP) geolocation, location via Wi-Fi® signal triangulation, location via detecting an NFC beacon signal that can indicate a particular location, and so forth.

The various memories (e.g., memory 1704, main memory 1712, static memory 1714, and/or memory of the processors 1702) and/or storage unit 1716 can store one or more sets of instructions and data structures (e.g., software) embodying or used by any one or more of the methodologies or functions described herein. These instructions (e.g., the instructions 1708), when executed by processors 1702, cause various operations to implement the disclosed examples.

The instructions 1708 can be transmitted or received over the network 1720, using a transmission medium, via a network interface device (e.g., a network interface component included in the communication components 1740) and using any one of a number of well-known transfer protocols (e.g., hypertext transfer protocol (HTTP)). Similarly, the instructions 1708 can be transmitted or received using a transmission medium via the coupling 1726 (e.g., a peer-to-peer coupling) to the devices 1722.

Various Notes

In the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code can form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) can be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed example. Thus, the following claims are hereby incorporated into the Detailed Description as examples or examples, with each claim standing on its own as a separate example, and it is contemplated that such examples can be combined with each other in various combinations or permutations. The scope of the invention should be determined with reference to the appended claims, along with the full scope of equivalents to which such claims are entitled.

What is claimed is:

1. A method for securely receiving delivery of a parcel, the method comprising:
    receiving, from a remote device and via a network, a parcel delivery notification at a local barrier door control circuit, the parcel delivery notification including an electronic message with information about a physical dimension attribute of the parcel;
    monitoring an environment using a camera;
    using an image processor circuit coupled to the camera, receiving the information about the physical dimension attribute of the parcel from the control circuit, and analyzing image information from the camera using a machine learning model to determine whether an object in the environment corresponds to the physical dimension attribute of the parcel, the physical dimension attribute received from the electronic message comprising the parcel delivery notification, to validate delivery of the parcel; and
    when the delivery of the parcel is validated using the image information from the camera, then providing a control signal from the control circuit to open a barrier door by a specified minimum opening amount to facilitate delivery of the parcel and inhibit entry of other unauthorized objects, wherein the specified minimum opening amount is based on information in the parcel delivery notification.

2. The method of claim 1, wherein analyzing the image information to validate the parcel delivery notification includes determining whether known delivery personnel are detected in the image information from the camera, and
    wherein providing the control signal to control operation of the barrier door includes providing instructions to open the barrier door when the known delivery personnel are detected.

3. The method of claim 1, wherein analyzing the image information to validate the parcel delivery notification includes determining whether a known delivery vehicle is detected in the image information from the camera, and wherein providing the control signal to control operation of the barrier door includes providing instructions to open the barrier door when the known delivery vehicle is detected.

4. The method of claim 1, wherein analyzing the image information to validate the parcel delivery notification includes determining that known delivery personnel and/or a known delivery vehicle is not detected in the image information from the camera, and
wherein providing the control signal to control operation of the barrier door includes providing instructions to close the barrier door or to maintain the barrier door in a closed position.

5. The method of claim 1, further comprising using the image processor circuit, analyzing subsequent image information from the camera to detect when a delivery event corresponding to the parcel delivery notification is completed; and
providing a second control signal from the control circuit to close or secure the barrier door.

6. The method of claim 1, further comprising when the parcel delivery notification is validated using the image information from the camera, then at least one of:
recording video and/or audio information using the same camera or a different camera, the video and/or audio information corresponding in time with delivery of the parcel or corresponding in location with delivery of the parcel; and
notifying a user that a delivery event is underway at a premises monitored by the camera; and
providing a control signal from the control circuit to open the barrier door by a specified minimum opening amount to facilitate delivery of the parcel and inhibit entry of other unauthorized objects.

7. The method of claim 1, further comprising providing a live video and/or audio feed from the camera to a user when the parcel delivery notification is validated using the image information from the camera.

8. The method of claim 1, wherein analyzing the image information from the camera using machine learning to validate the parcel delivery notification includes applying one or more frames from the camera as an input to a first neural network and, in response, receiving an indication of a likelihood that the one or more frames includes at least a portion of a specified object having the physical dimension attribute; and
wherein providing the control signal to control operation of the barrier door includes when the likelihood meets or exceeds a threshold likelihood criteria; and
wherein the specified object includes one or more of the parcel, delivery personnel, or a delivery vehicle.

9. The method of claim 1, wherein analyzing the image information from the camera includes:
receiving multiple frames from the camera, the multiple frames corresponding to a sequence of substantially adjacent time instances;
identifying a difference between a portion of at least first and second frames from among the multiple frames, the difference indicating movement by a first object in an environment monitored by the camera;
selecting a third frame from among the multiple frames for full-frame analysis;
applying the third frame as an input to a first neural network and, in response, receiving a first indication of a likelihood that the third frame includes at least a portion of a specified object; and providing a validation score based on the identified difference and on the received first indication of the likelihood that the third frame includes at least a portion of the specified object;
wherein providing the control signal to control operation of the barrier door is conditioned on the validation score.

10. An image-based machine learning system for using neural network processing to determine whether to operate a barrier door in an environment to automatically accept delivery of a parcel into a secure area, the system comprising:
a first camera configured to receive a series of images of the environment, wherein each of the images corresponds to a different frame acquired at a different time; and
a processor circuit configured to:
identify a difference between a portion of at least first and second frames acquired by the first camera, the difference indicating movement by a first object in the environment monitored by the first camera;
select a third frame from among the multiple frames for full-frame analysis;
apply the third frame as an input to a first neural network and in response determine that the third frame includes at least a portion of an image of a different second object; and
responsive to (1) the identified difference between the first and second frames indicating movement by the first object and (2) the determination that the third frame includes at least a portion of an image of the second object, provide an indication that the second object is present in the environment, wherein the second object includes one or more of the parcel, delivery personnel, or a delivery vehicle, and generate a control signal to open the barrier door by a specified minimum opening amount to facilitate delivery of the parcel into the secure area and inhibit entry of other unauthorized objects, wherein the specified minimum opening amount is based on dimension information about the parcel.

11. The system of claim 10, wherein the first camera comprises a portion of a home or business automation system that includes multiple cameras and other sensors.

12. The system of claim 10, further comprising a communication circuit coupled to the processor circuit and the first camera, wherein the communication circuit is configured to provide video and/or audio information from the camera to a user in response to the indication that the second object is present in the environment.

13. The system of claim 10, wherein the first camera is configured to receive the series of images of the environment in a YUV color space; and
wherein the processor circuit is configured to identify the difference between a portion of at least first and second frames acquired by the first camera using only the Y information from the YUV color space; and
wherein the processor circuit is configured to apply only the Y information about the third frame from the YUV color space as the input to the first neural network.

14. A method for operating a barrier based on a determination about whether a designated object is present in or absent from an environment monitored by a camera using image information from the camera, the method comprising:
receiving, at a first processor circuit, multiple frames from the camera, the multiple frames corresponding to a sequence of substantially adjacent time instances;

using the first processor circuit, identifying a difference between a portion of at least first and second frames from among the multiple frames, the difference indicating movement by a first object in the environment monitored by the camera;

using the first processor circuit, selecting a third frame from among the multiple frames for full-frame analysis;

using the first processor circuit, applying the third frame as an input to a first neural network and, in response, receiving a first indication of a likelihood that the third frame includes at least a portion of the designated object; and using the first processor circuit, providing a control signal to a barrier control device, the control signal including information about whether the designated object is present in or absent from the environment, wherein the information is based on (1) the identified difference indicating movement by the first object, and on (2) the received first indication of the likelihood that the third frame includes at least a portion of an image of the designated object, and wherein the control signal is configured to control automated opening of the barrier by a specified minimum opening amount to facilitate delivery of the designated object and inhibit entry of other unauthorized objects, wherein the specified minimum opening amount is based on dimension information about the designated object.

15. The method of claim 14, further comprising opening the barrier when the information indicates the designated object is present in the environment;

providing information about delivery of a parcel through the barrier to a user or to a sender of the parcel, the parcel comprising the designated object; and recording audio and/or video information from the environment using the same or different camera, the recording being concurrent with or following the opening the barrier;

wherein providing the information about delivery of the parcel through the barrier includes providing at least a portion of the recorded audio and/or video information.

16. The method of claim 14, further comprising using the first processor circuit, providing a notification to a user to monitor a live feed of video and/or audio information from the environment using the same camera or a different camera, the video and/or audio information including information about delivery of a parcel to a secure area behind the barrier, wherein the parcel comprises the designated object.

17. The method of claim 14, further comprising receiving a parcel delivery notification at the first processor circuit; and using the first processor circuit, determining a correspondence between the parcel delivery notification and the designated object;

wherein providing the control signal to the barrier control device includes providing a command to open or close a barrier door based on the correspondence between the parcel delivery notification and the designated object; and wherein receiving the parcel delivery notification includes receiving the parcel delivery notification from a delivery vehicle system or from a mobile device of a delivery driver.

18. The method of claim 14, further comprising receiving a parcel delivery notification at the barrier control device; and using the barrier control device, determining a correspondence between the parcel delivery notification and the information about whether the designated object is present in or absent from the environment;

wherein providing the control signal to the barrier control device includes providing a command to open or close a barrier door based on the correspondence between the parcel delivery notification and the information about whether the designated object is present in or absent from the environment.

* * * * *